US012486474B2

(12) United States Patent
Rightmire et al.

(10) Patent No.: US 12,486,474 B2
(45) Date of Patent: Dec. 2, 2025

(54) PPE-FREE TABLET DEGREASER AND MULTIPURPOSE CLEANER

(71) Applicant: ECOLAB USA INC., Saint Paul, MN (US)

(72) Inventors: Kelly Anne Rightmire, Saint Paul, MN (US); Eileen McIntire, Saint Paul, MN (US); Erik C. Olson, Saint Paul, MN (US); Kerrie E. Walters, Saint Paul, MN (US); Stephan Hubig, Saint Paul, MN (US); Victor Fuk-Pong Man, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 316 days.

(21) Appl. No.: 18/300,756

(22) Filed: Apr. 14, 2023

(65) Prior Publication Data

US 2024/0002753 A1 Jan. 4, 2024

Related U.S. Application Data

(60) Provisional application No. 63/363,034, filed on Apr. 15, 2022.

(51) Int. Cl.

| | |
|---|---|
| ***C11D 1/00*** | (2006.01) |
| ***B08B 3/04*** | (2006.01) |

(Continued)

(52) U.S. Cl.

CPC .................. *C11D 3/10* (2013.01); *C11D 1/88* (2013.01); *C11D 3/08* (2013.01); *C11D 3/2082* (2013.01);

(Continued)

(58) Field of Classification Search

CPC .. C11D 1/00; C11D 1/665; C11D 1/72; C11D 3/08; C11D 3/10; C11D 3/2075;

(Continued)

(56) References Cited

U.S. PATENT DOCUMENTS

| | | | |
|---|---|---|---|
| 5,552,079 | A | 9/1996 | Roach et al. |
| 5,658,867 | A | 8/1997 | Pancheri et al. |

(Continued)

FOREIGN PATENT DOCUMENTS

| | | | |
|---|---|---|---|
| CA | 2215206 | C | 9/1996 |
| CN | 105542993 | A | 5/2016 |

(Continued)

OTHER PUBLICATIONS

International Search Report and Written Opinion in PCT/US2020/021309, mailed Jul. 3, 2020, 14 pages.

(Continued)

*Primary Examiner* — Brian P Mruk

(74) *Attorney, Agent, or Firm* — McKee, Voorhees & Sease, PLC

(57) ABSTRACT

Solid cleaning compositions that are safe for contact without the use of personal protective equipment (PPE) and have optimal dissolution rate and degreasing performance. In particular, the solid cleaning compositions include a non-hydroxide alkali metal alkalinity source(s), acid(s), water conditioning agent(s), a cleaning surfactant comprising an amphoteric, anionic and/or nonionic surfactant(s) and/or a coating surfactant comprising a nonionic surfactant(s) to provide the optimal dissolution and performance while being PPE-free are disclosed. Methods of providing concentrate and/or use solutions of the solid cleaning compositions and methods of use thereof are also disclosed.

20 Claims, 7 Drawing Sheets

(51) Int. Cl.

| | |
|---|---|
| ***C11D 1/72*** | (2006.01) |
| ***C11D 1/88*** | (2006.01) |
| ***C11D 3/08*** | (2006.01) |
| ***C11D 3/10*** | (2006.01) |
| ***C11D 3/20*** | (2006.01) |
| ***C11D 3/33*** | (2006.01) |
| ***C11D 17/04*** | (2006.01) |

(52) U.S. Cl.
CPC ......... *C11D 17/044* (2013.01); *C11D 2111/14* (2024.01)

(58) Field of Classification Search
CPC ....... C11D 3/2082; C11D 3/2086; C11D 3/33; C11D 11/0023; C11D 17/044; B08B 3/04
See application file for complete search history.

(56) References Cited

U.S. PATENT DOCUMENTS

| | | | | |
|---|---|---|---|---|
| 5,663,132 | A | 9/1997 | Talley | |
| 5,713,384 | A | 2/1998 | Roach et al. | |
| 5,731,279 | A | 3/1998 | Pancheri | |
| 5,759,976 | A | 6/1998 | Roach et al. | |
| 6,326,345 | B1 | 12/2001 | Mondin | |
| 6,444,632 | B1 | 9/2002 | Mondin | |
| 6,455,484 | B1 | 9/2002 | Gladfelter et al. | |
| 6,486,109 | B1 | 11/2002 | Mondin | |
| 6,486,111 | B1 | 11/2002 | Zabarylo et al. | |
| 6,498,134 | B1 | 12/2002 | Scheibel et al. | |
| 6,506,717 | B1 | 1/2003 | Kott et al. | |
| 6,596,682 | B1 | 7/2003 | Gorlin et al. | |
| 6,605,583 | B1 | 8/2003 | Gorlin | |
| 6,608,022 | B1 | 8/2003 | Zabarylo et al. | |
| 6,673,765 | B1 | 1/2004 | Schulz et al. | |
| 6,774,099 | B1 | 8/2004 | Scheibel et al. | |
| 6,974,790 | B2 | 12/2005 | Zabarylo et al. | |
| 6,995,126 | B2 | 2/2006 | Perkis et al. | |
| 7,378,380 | B2 | 5/2008 | Blagg et al. | |
| 7,893,012 | B2 | 2/2011 | Tjelta et al. | |
| 8,138,135 | B2 | 3/2012 | Moore et al. | |
| 8,652,434 | B2 | 2/2014 | Moore et al. | |
| 11,377,626 | B2 * | 7/2022 | Olson | C11D 3/33 |
| 2001/0023239 | A1 | 9/2001 | Lentsch et al. | |
| 2003/0100464 | A1 | 5/2003 | Kott et al. | |
| 2004/0157760 | A1 | 8/2004 | Man et al. | |
| 2004/0157762 | A1 | 8/2004 | Meinke et al. | |
| 2005/0101509 | A1 | 5/2005 | Zabarylo et al. | |
| 2005/0130863 | A1 | 6/2005 | Blagg et al. | |
| 2005/0288209 | A1 | 12/2005 | Fletcher | |
| 2008/0045433 | A1 | 2/2008 | Blagg et al. | |
| 2008/0274928 | A1 | 11/2008 | Smith et al. | |
| 2013/0123164 | A1 | 5/2013 | Jones et al. | |
| 2013/0130964 | A1 | 5/2013 | Besse et al. | |
| 2013/0139856 | A1 | 6/2013 | Vinson et al. | |
| 2015/0315518 | A1 | 11/2015 | Walls et al. | |
| 2016/0068741 | A1 | 3/2016 | Talley | |
| 2016/0145547 | A1 | 5/2016 | Michaels et al. | |
| 2017/0002303 | A1 | 1/2017 | Moore | |
| 2018/0282665 | A1 | 10/2018 | Mansergh et al. | |
| 2019/0276773 | A1 | 9/2019 | Olson et al. | |
| 2020/0277550 | A1 | 9/2020 | Cabanas et al. | |
| 2020/0277554 | A1 | 9/2020 | Nelson et al. | |
| 2020/0283701 | A1 | 9/2020 | Emiru et al. | |
| 2020/0332234 | A1 * | 10/2020 | Naqvi | C11D 17/0073 |
| 2021/0095227 | A1 | 4/2021 | Lundberg et al. | |
| 2024/0002753 | A1 | 1/2024 | Rightmire et al. | |

FOREIGN PATENT DOCUMENTS

| | | | | |
|---|---|---|---|---|
| CN | 105969550 | A | 9/2016 | |
| CN | 106190637 | A | 12/2016 | |
| EP | 504091 | * | 9/1992 | C11D 3/00 |
| EP | 0504091 | A1 | 9/1992 | |
| JP | 2008050410 | A | 3/2008 | |
| JP | 2017222768 | A | 12/2017 | |
| JP | 2021152186 | A | 9/2021 | |
| WO | 9729175 | A1 | 8/1997 | |
| WO | 2010061239 | A1 | 6/2010 | |
| WO | 2013085914 | A1 | 6/2013 | |
| WO | 2014121406 | A1 | 8/2014 | |

OTHER PUBLICATIONS

International Search Report and Written Opinion in PCT/US2024/023958, mailed Jul. 22, 2024, 16 pages.

International Search Report and Written Opinion in PCT/US2023/065754, mailed Jul. 4, 2023, 10 pages.

* cited by examiner

PPE-FREE TABLET DEGREASER AND MULTIPURPOSE CLEANER

CROSS REFERENCE TO RELATED APPLICATIONS

This application claims priority under 35 U.S.C. § 119 to provisional patent application U.S. Ser. No. 63/363,034, filed Apr. 15, 2022. The provisional patent application is herein incorporated by reference in its entirety, including without limitation, the specification, claims, and abstract, as well as any figures, tables, appendices, or drawings thereof.

TECHNICAL FIELD

The invention relates to solid cleaning compositions that are safe for contact without the use of personal protective equipment (PPE) and have optimal dissolution rate and degreasing performance. In particular, the solid cleaning compositions include a non-hydroxide alkali metal alkalinity source(s), acid(s), water conditioning agent(s), a cleaning surfactant comprising an amphoteric, anionic and/or nonionic surfactant(s) and/or a coating surfactant comprising a nonionic surfactant(s) to provide the optimal dissolution and performance while being PPE-free. Methods of providing concentrate and/or use solutions of the solid cleaning compositions and methods of use thereof are also provided.

BACKGROUND

Various liquid detergents and cleaning products are commercially-available and known in the art. The formulation of alkaline liquid detergents requires both cleaning performance (i.e. removing dirt and soils) and maintaining stable emulsions, suspension and/or solutions for the liquid product. There can be various challenges in transporting and storing liquid cleaning products. Therefore, it can be desirable to replace liquid formulations with solid cleaning compositions. However, providing solid formulations that have both shelf-stability and provide liquid use compositions that are also stable for extended periods of time can be difficult to provide, while maintaining (or exceeding) cleaning performance. Moreover, providing concentrated liquid use compositions can be difficult as solids can be highly concentrated, whereas liquids are inherently limited in concentration by solubility.

Moreover, as many known surfactants are broadly used in solid detergent formulations, prior innovation has failed to recognize the need for reduced dissolution times when generating use solutions. Providing solid compositions that are readily dissolved into liquid use compositions, preferably in less than 20 minutes or less than 10 minutes, remains a challenge.

Accordingly, it is an objective of the compositions to provide cleaning compositions that provide at least a substantially similar concentration of surfactants and/or alkalinity in comparison to a liquid concentrated cleaning composition.

It is a further objective to develop solid hard surface and multi-use cleaning compositions that provide at least equivalent cleaning performance, or superior cleaning performance, to solid compositions.

A further object of the invention is to provide stable hard surface cleaning compositions that provide optimal dissolution into stable ready-to-use formulations.

A further object of the invention is to provide solid hard surface cleaning compositions that do not include hydroxide alkalinity and that are safe for contact without the use of personal protective equipment (PPE) and are compatible with soft metals.

Other objects, embodiments and advantages of this invention will be apparent to one skilled in the art in view of the following disclosure, the drawings, and the appended claims.

BRIEF SUMMARY

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art. It is a further objective to provide solid cleaning compositions comprising: a non-hydroxide alkali metal alkalinity source; an acid; at least one water conditioning agent comprising an aminocarboxylic acid, a polycarboxylic acid, an aminophosphonate or combination thereof; and a cleaning surfactant comprising an amphoteric, anionic and/or nonionic surfactant and/or a coating surfactant comprising a short chain nonionic, and/or polymer surfactant; wherein the composition is substantially-free of hydroxide alkalinity and is PPE-free.

It is a further objective to provide solid cleaning compositions comprising: an alkali metal carbonate, alkali metal bicarbonate, and/or alkali metal silicate alkalinity source; a polycarboxylic acid having between 2 and 4 carboxyl groups; at least two water conditioning agents comprising an aminocarboxylic acid and polycarboxylic acid; a cleaning surfactant comprising an amine oxide amphoteric surfactant and/or a coating surfactant comprising a short chain PEG 200-800, an alcohol ethoxylate, a polymer surfactant, or combinations thereof; and a corrosion inhibitor comprising an alkali metal silicate and/or alkali metal metasilicate; wherein the composition is substantially-free of hydroxide alkalinity and is PPE-free.

It is a still further objective to provide methods of preparing a cleaning composition comprising: adding the solid cleaning compositions described herein to a diluent to dissolve the solid cleaning composition into a concentrate or use solution; wherein the dissolution time for the solid cleaning composition is less than about 20 minutes, or preferably less than about 10 minutes. These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

While multiple embodiments are disclosed, still other embodiments will become apparent to those skilled in the art from the following detailed description, which shows and describes illustrative embodiments. Accordingly, the drawings and detailed description are to be regarded as illustrative in nature and not restrictive.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated.

Figure 1:
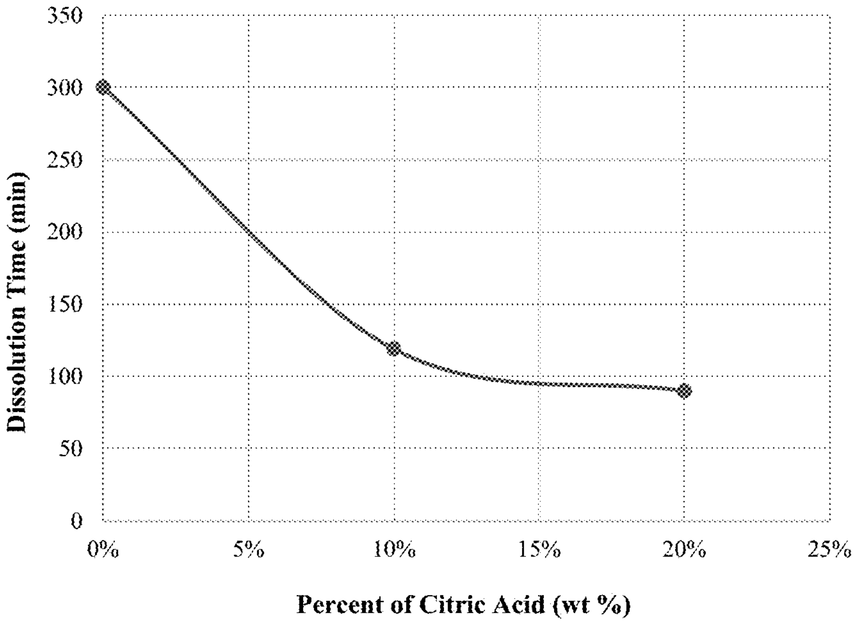
FIG. 1 shows a graph comparing the dissolution time of evaluated solid cleaning compositions with different percentages of added citric acid.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention. An artisan of ordinary skill in the art need not view, within isolated figure(s), the near infinite number of distinct permutations of features described in the following detailed description to facilitate an understanding of the present invention.

DETAILED DESCRIPTION OF THE INVENTION

The present invention relates to solid cleaning compositions that provide optimal dissolution rates and enhanced cleaning efficacy, including degreasing performance. The present disclosure is not to be limited to that described herein, which can vary and are understood by skilled artisans. No features shown or described are essential to permit basic operation of the present invention unless otherwise indicated. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾. This applies regardless of the breadth of the range.

As used herein, the term "and/or", e.g., "X and/or Y" shall be understood to mean either "X and Y" or "X or Y" and shall be taken to provide explicit support for both meanings or for either meaning, e.g. A and/or B includes the options i) A, ii) B or iii) A and B.

It is to be appreciated that certain features that are, for clarity, described herein in the context of separate embodiments, may also be provided in combination in a single embodiment. Conversely, various features that are, for brevity, described in the context of a single embodiment, may also be provided separately or in any sub-combination.

The methods and compositions of the present invention may comprise, consist essentially of, or consist of the components and ingredients of the present invention as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

Unless defined otherwise, all technical and scientific terms used above have the same meaning as commonly understood by one of ordinary skill in the art to which embodiments of the present invention pertain.

The terms "invention" or "present invention" are not intended to refer to any single embodiment of the particular invention but encompass all possible embodiments as described in the specification and the claims.

The term "about," as used herein, refers to variation in the numerical quantity that can occur, for example, through typical measuring techniques and equipment, with respect to any quantifiable variable, including, but not limited to, mass, volume, time, temperature, pH, and log count of bacteria or viruses. Further, given solid and liquid handling procedures used in the real world, there is certain inadvertent error and variation that is likely through differences in the manufacture, source, or purity of the ingredients used to make the compositions or carry out the methods and the like. The term "about" also encompasses these variations. Whether or not modified by the term "about," the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts. It is also sometimes indicated by a percentage in parentheses, for example, "chemical (10%)."

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

As used herein, the term "antimicrobial" refers to a compound or composition that reduces and/or inactivates a microbial population, including, but not limited to bacteria, viruses, fungi, and algae within about 10 minutes or less, about 8 minutes or less, about 5 minutes or less, about 3 minutes or less, about 2 minutes or less, about 1 minute or less, or about 30 seconds or less. Preferably, the term antimicrobial refers to a composition that provides at least about a 3-log, 3.5 log, 4 log, 4.5 log, or 5 log reduction of a microbial population in about 10 minutes or less, about 8 minutes or less, about 5 minutes or less, about 3 minutes or less, about 2 minutes or less, about 1 minute or less, or about 30 seconds or less.

As used herein, the term "cleaning" refers to a method used to facilitate or aid in soil removal, bleaching, microbial population reduction, and any combination thereof. As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

As used herein, the term "exemplary" refers to an example, an instance, or an illustration, and does not indicate a most preferred embodiment unless otherwise stated.

As used herein, the phrase "food processing surface" refers to a surface of a tool, a machine, equipment, a structure, a building, or the like that is employed as part of a food processing, preparation, or storage activity. Examples of food processing surfaces include surfaces of food processing or preparation equipment (e.g., slicing, canning, or transport equipment, including flumes), of food processing wares (e.g., utensils, dishware, wash ware, and bar glasses), and of floors, walls, or fixtures of structures in which food processing occurs. Food processing surfaces are found and employed in food anti-spoilage air circulation systems, aseptic packaging sanitizing, food refrigeration and cooler cleaners and sanitizers, ware washing sanitizing, blancher cleaning and sanitizing, food packaging materials, cutting board additives, third-sink sanitizing, beverage chillers and warmers, meat chilling or scalding waters, autodish sanitizers, sanitizing gels, cooling towers, food processing antimicrobial garment sprays, and non-to-low-aqueous food preparation lubricants, oils, and rinse additives.

As used herein, the term "free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "generally" encompasses both "about" and "substantially."

The term "hard surface" refers to a solid, substantially non-flexible surface such as a counter top, tile, floor, wall, panel, window, plumbing fixture, kitchen and bathroom furniture, appliance, engine, circuit board, dish, mirror, window, monitor, touch screen, and thermostat. Hard surfaces are not limited by the material; for example, a hard surface can be glass, metal, tile, vinyl, linoleum, composite, wood, plastic, etc. Hard surfaces may include for example, health care surfaces and food processing surfaces.

As used herein, the phrase "health care surface" refers to a surface of an instrument, a device, a cart, a cage, furniture, a structure, a building, or the like that is employed as part of a health care activity. Examples of health care surfaces include surfaces of medical or dental instruments, of medical or dental devices, of electronic apparatus employed for monitoring patient health, and of floors, walls, or fixtures of structures in which health care occurs. Health care surfaces are found in hospital, surgical, infirmity, birthing, mortuary, and clinical diagnosis rooms. These surfaces can be those typified as "hard surfaces" (such as walls, floors, bed-pans, etc.), or fabric surfaces, e.g., knit, woven, and non-woven surfaces (such as surgical garments, draperies, bed linens, bandages, etc.,), or patient-care equipment (such as respirators, diagnostic equipment, shunts, body scopes, wheel chairs, beds, etc.,), or surgical and diagnostic equipment. Health care surfaces include articles and surfaces employed in animal health care.

As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

As used herein the term "polymer" refers to a molecular complex comprised of a more than ten monomeric units and generally includes, but is not limited to, homopolymers, copolymers, such as for example, block, graft, random and alternating copolymers, terpolymers, and higher "x"mers, further including their analogs, derivatives, combinations, and blends thereof. Furthermore, unless otherwise specifically limited, the term "polymer" shall include all possible isomeric configurations of the molecule, including, but are not limited to isotactic, syndiotactic and random symmetries, and combinations thereof. Furthermore, unless otherwise specifically limited, the term "polymer" shall include all possible geometrical configurations of the molecule.

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

As used herein, the term "soil" or "stain" refers to any soil, including, but not limited to, non-polar oily and/or hydrophobic substances which may or may not contain particulate matter such as industrial soils, mineral clays, sand, natural mineral matter, carbon black, graphite, kaolin, environmental dust, and/or food based soils such as blood, proteinaceous soils, starchy soils, fatty soils, cellulosic soils, etc.

The term "substantially" refers to a great or significant extent. "Substantially" can thus refer to a plurality, majority, and/or a supermajority of said quantifiable variable, given proper context.

As used herein, the term "substantially free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "substantially similar cleaning performance" refers generally to achievement by a substitute cleaning product or substitute cleaning system of generally the same degree (or at least not a significantly lesser degree) of cleanliness or with generally the same expenditure (or at least not a significantly lesser expenditure) of effort, or both.

The term "surfactant" or "surface active agent" refers to an organic chemical that when added to a liquid changes the properties of that liquid at a surface.

As used herein, the term "ware" refers to items such as eating and cooking utensils, dishes, and other hard surfaces such as showers, sinks, toilets, bathtubs, countertops, windows, mirrors, transportation vehicles, and floors. As used herein, the term "warewashing" refers to washing, cleaning, or rinsing ware. Ware also refers to items made of plastic. Types of plastics that can be cleaned with the compositions according to the invention include but are not limited to, those that include polypropylene polymers (PP), polycarbonate polymers (PC), melamine formaldehyde resins or melamine resin (melamine), acrylonitrile-butadiene-styrene polymers (ABS), and polysulfone polymers (PS). Other exemplary plastics that can be cleaned using the compounds and compositions of the invention include polyethylene terephthalate (PET) polystyrene polyamide.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with 'weight percent,' "wt-%," etc.

Solid Cleaning Compositions

According to embodiments, the solid cleaning compositions include the alkalinity source, acid, water conditioning agent, and surfactants (cleaning and/or coating surfactants). The solid cleaning compositions can include additional functional ingredients. Exemplary solid cleaning compositions are shown in Tables 1A-1C in weight percentage. While the components may have a percent actives of 100%, it is noted that Tables 1A-1C do not recite the percent actives of the components, but rather, recites the total weight percentage of the raw materials (i.e. active concentration plus inert ingredients).

TABLE 1A

| Material | First Exemplary Range wt.-% | Second Exemplary Range wt.-% | Third Exemplary Range wt.-% |
|---|---|---|---|
| Alkalinity Source | 20-90 | 30-90 | 40-90 |
| Acid | 1-40 | 10-40 | 15-30 |
| Surfactant(s) (cleaning and/or coating) | 1-50 | 1-25 | 5-20 |
| Water Conditioning Agent(s) | 0.1-25 | 1-20 | 5-20 |
| Additional Functional Ingredients | 0-50 | 0-35 | 0-25 |

TABLE 1B

[coating surfactant is optional]

| Material | First Exemplary Range wt.-% | Second Exemplary Range wt.-% | Third Exemplary Range wt.-% |
|---|---|---|---|
| Alkali Metal Carbonate Alkalinity Source | 20-90 | 30-90 | 40-90 |
| Acid | 1-40 | 10-40 | 15-30 |
| Amphoteric, Anionic and/or Nonionic Cleaning Surfactant(s) | 1-40 | 5-25 | 5-20 |
| Coating Surfactant(s) | 0-25 | 0-15 | 0-10 |
| Water Conditioning Agent(s) | 0.1-25 | 1-20 | 5-20 |
| Additional Functional Ingredients | 0-50 | 0-35 | 0-25 |

TABLE 1C

[cleaning surfactant is optional]

| Material | First Exemplary Range wt.-% | Second Exemplary Range wt.-% | Third Exemplary Range wt.-% |
|---|---|---|---|
| Alkali Metal Carbonate Alkalinity Source | 20-90 | 30-90 | 40-90 |
| Acid | 1-40 | 10-40 | 15-30 |
| Amphoteric, Anionic and/or Nonionic Cleaning Surfactant(s) | 0-40 | 0-25 | 0-20 |

TABLE 1C-continued

[cleaning surfactant is optional]

| Material | First Exemplary Range wt.-% | Second Exemplary Range wt.-% | Third Exemplary Range wt.-% |
|---|---|---|---|
| Coating Surfactant(s) | 1-25 | 1-15 | 5-10 |
| Water Conditioning Agent(s) | 0.1-25 | 1-20 | 5-20 |
| Additional Functional Ingredients | 0-50 | 0-35 | 0-25 |

Exemplary embodiments of the solid cleaning compositions can comprise, consist essentially of, or consist of: a non-hydroxide alkali metal alkalinity source; an acid; at least one water conditioning agent comprising an aminocarboxylic acid, a polycarboxylic acid, an aminophosphonate or combination thereof; and a cleaning surfactant comprising an amphoteric, anionic and/or nonionic surfactant and/or a coating surfactant comprising a short chain nonionic, and/or polymer surfactant; wherein the composition is substantially-free of hydroxide alkalinity and is PPE-free.

As referred to herein, the solid cleaning compositions are PPE-free as they are provided in single use compositions and packaging. In an embodiment, the solid cleaning compositions are PPE-free as they are individually wrapped in packaging that does not require use of PPE, such as foil packets. Moreover, the solid compositions once dissolved into a use solution are further PPE-free as the pH is below about 10.5, pH between about 5 and about 10.5, or between about 8 and about 10.

Exemplary embodiments of the solid cleaning compositions can comprise, consist essentially of, or consist of: an alkali metal carbonate, alkali metal bicarbonate, and/or alkali metal silicate alkalinity source; a polycarboxylic acid having between 2 and 4 carboxyl groups; at least two water conditioning agents comprising an aminocarboxylic acid and polycarboxylic acid; a cleaning surfactant comprising an amine oxide amphoteric surfactant and/or a coating surfactant comprising a short chain PEG 200-800, an alcohol ethoxylate, a polymer surfactant, or combinations thereof; and a corrosion inhibitor comprising an alkali metal silicate and/or alkali metal metasilicate; wherein the composition is substantially-free of hydroxide alkalinity and is PPE-free.

The solid cleaning compositions are solid concentrates that are diluted to form use compositions. In general, a concentrate refers to a composition that is intended to be diluted with water to provide a use solution that contacts an object to provide the desired cleaning, sanitizing, or the like. The solid cleaning composition that contacts the articles to be washed can be referred to as a concentrate or a use composition (or use solution) dependent upon the formulation employed in methods. It should be understood that the concentration of the components in the solid cleaning compositions will vary depending on the concentrated nature of the formulation and the desired use solution thereof.

The solid hard surface cleaning compositions provide shelf stable solid compositions. The solid hard surface cleaning compositions are shelf stable, including at elevated storage temperatures, including for example at temperatures up to at least 50° C. (or 100° F.) for at least 8 weeks with a growth exponent (or change in dimension or change in volume of the solid) of less than about 15%, or less than about 10% demonstrating shelf stability at room temperature or ambient temperatures for at least about 2 years for tablet compositions (having increased growth exponent compared to solid block compositions). It is a significant benefit for the solid cleaning compositions to exhibit both solid stability and use composition stability for extended periods of time.

In some embodiments, the solid cleaning concentrate is shelf stable, or has a shelf-life, of more than six months, more than 1 year, or more than 2 years. In an embodiment, the solid cleaning concentrate has a shelf-life of about 2 years.

In some embodiments, a ready-to-use solution of the solid cleaning concentrate diluted to form a use composition is shelf stable, or has a shelf-life, of one day, or more than one day, or more than one week, or more than two weeks. In an embodiment, the ready-to-use diluted form of the solid compositions have a shelf-life of about two weeks.

In some aspects, the solid compositions when diluted to form a use composition have a pH below about 10.5, pH between about 5 and about 10.5, or between about 8 and about 10.

Alkalinity Source

The solid cleaning composition includes an effective amount of one or more alkalinity sources to enhance cleaning of a substrate and improve soil removal performance at a use pH of less than about 10.5, or between about 8 and about 10.5. A preferred pH is less than about 10.5 to ensure the use of PPE is not required. The solid cleaning compositions include between about 20% by weight and about 90% by weight, between about 30% by weight and about 90% by weight, between about 40% by weight and about 90% by weight, between about 40% by weight and about 80% by weight, or between about 40% by weight and about 70% by weight of the alkalinity source(s).

Examples of suitable alkaline sources for the solid hard surface cleaning compositions include, but are not limited to an alkali metal carbonates, bicarbonate, sesquicarbonate, and mixtures thereof. Exemplary alkali metal carbonates that can be used include, but are not limited to sodium or potassium carbonate, bicarbonate, sesquicarbonate, and mixtures thereof. Additional alkalinity sources include, for example, alkali metal silicates such as sodium or potassium silicate or metasilicate; metal carbonates such as sodium or potassium carbonate, bicarbonate, sesquicarbonate; metal borates such as sodium or potassium borate; and ethanolamines and amines.

Preferred solid cleaning compositions do not include any alkali metal hydroxides, including for example potassium or sodium hydroxide and are comprised of alkali metal carbonate, alkali metal bicarbonate and/or alkali metal silicates.

Acid

The solid cleaning composition includes an acid in an effective amount to aid as a dissolution aid for the solid composition. Without being bound by a particular mechanism of action, the acid reacts with the alkalinity source in the composition to create effervescence to enhance the rate or speed of the physical break-up of the solid composition. The solid cleaning compositions include between about 1% by weight and about 40% by weight, between about 10% by weight and about 40% by weight, between about 15% by weight and about 40% by weight, between about 15% by weight and about 30% by weight, or between about 20% by weight and about 30% by weight of the acid(s).

As referred to herein the solid composition comprises an acid or salt thereof. Preferably the acid has an aqueous solubility between 0.1 g/L and 1500 g/L at 20° C., more preferably between 0.25 g/L and 500 g/L at 20° C., most preferably between 0.25 and 100 g/L at 20° C. As used herein, the g/L description refers to the mass of acid added with sufficient aqueous medium (e.g., water) to form one liter of solution. Preferably the acid is a polycarboxylic acid. More preferably, the acid is a polycarboxylic acid having between 2 and 4 carboxyl groups. More preferably the polycarboxylic acid is a dicarboxylic acid or a tricarboxylic acid. Preferred acids include, but are not limited to, citric acid, adipic acid, ethylenediamine tetra acetic acid, isocitric acid, glutamic acid, glutaric acid, malic acid, propane-1,2,3-tricarboxylic acid, succinic acid, tartaric acid, salts of the foregoing, and mixtures thereof.

In an embodiment the acid is adipic acid and provides desired tablet stability. In a further embodiment the acid is citric acid and provides a desired balance of tablet stability and dissolution rate.

Water Conditioning Agent

The solid cleaning compositions include at least one water conditioning agent, which can include chelant or chelating agent or a water conditioning polymer.

Various chelants can be employed as water conditioning agents to coordinate (i.e., bind) the metal ions commonly found in natural water to prevent the metal ions from interfering with the action of the other detersive ingredients of a cleaning composition. In general, chelants can generally be referred to as a type of builder and may also function as a threshold agent when included in an effective amount. The solid cleaning compositions include between about 0.1% by weight and about 40% by weight, between about 0.1% by weight and about 25% by weight, between about 1% by weight and about 25% by weight, between about 1% by weight and about 20% by weight, between about 5% by weight and about 20% by weight, or between about 10% by weight and about 20% by weight of the water conditioning agent(s).

A preferred chelant as water conditioning agent is an aminocarboxylic acid include, for example, methylglycinediacetic acid (MGDA), N, N-dicarboxymethyl glutamic acid (GLDA), N-hydroxyethyliminodiacetic acid, nitrilotriacetic acid (NTA), ethylenediaminetetraacetic acid (EDTA), N-hydroxyethyl-ethylenediaminetriacetic acid (HEDTA), diethylenetriaminepentaacetic acid (DTPA), ethylenediaminetetraproprionic acid, triethylenetetraaminehexaacetic acid (TTHA), and the respective alkali metal, ammonium and substituted ammonium salts thereof.

Additional chelants as water conditioning agents include: phosphonates, including phosphonic acid; phosphates, including condensed phosphates such as sodium and potassium orthophosphate, sodium and potassium pyrophosphate, sodium tripolyphosphate, sodium hexametaphosphate, and the like; organic chelating agents, including both polymeric and small molecule chelating agents such as organocarboxylate compounds or organophosphate chelating agents; polymeric chelating agents, including polyanionic compositions such as polyacrylic acid compounds.

The water conditioning agent may also be a polymer including for example water soluble polycarboxylate polymers such as homopolymeric and copolymeric compositions with pendant (—COOH) carboxylic acid groups and include polyacrylic acid, polymethacrylic acid, polymaleic acid, acrylic acid-methacrylic acid copolymers, acrylic-maleic copolymers, hydrolyzed polyacrylamide, hydrolyzed methacrylamide, hydrolyzed acrylamide-methacrylamide copolymers, hydrolyzed polyacrylonitrile, hydrolyzed polymethacrylonitrile, hydrolyzed acrylonitrile methacrylonitrile copolymers, or mixtures thereof. Water soluble salts or partial salts of these polymers or copolymers such as their respective alkali metal (for example, sodium or potassium) or ammonium salts can also be used. The weight average molecular weight of the polymers is from about 400 to about 20,000 g/mol. An example of commercially available polycarboxylic acids (polycarboxylates) is ACUSOL 445 which is a homopolymer of acrylic acid with an average molecular weight of 4500 (Dow Chemicals). ACUSOL 445 is available as partially neutralized, liquid detergent polymer.

Exemplary polymers include polyacrylic acid, the partial sodium salts of polyacrylic acid or sodium polyacrylate having an average molecular weight within the range of 4000 to 8000. Further exemplary polymers include polycarboxylates, such as polyacrylic acid, maleic/olefin copolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, and hydrolyzed acrylonitrile-methacrylonitrile copolymers.

In an exemplary embodiment the water conditioning agent includes an aminocarboxylic acid that is one or more of methylglycinediacetic acid (MGDA), N-hydroxyethyliminodiacetic acid, nitrilotriacetic acid (NTA), ethylenediaminetetraacetic acid (EDTA), N-hydroxyethyl-ethylenediaminetriacetic acid (HEDTA), diethylenetriaminepentaacetic acid (DTPA), ethylenediaminetetraproprionic acid, and triethylenetetraaminehexaacetic acid, and a water conditioning polymer is a homopolymer of acrylic acid.

Surfactants

The solid cleaning compositions include a combination of surfactants to provide both the degreasing efficacy (i.e. performance) with the optimal dissolution rates. Various surfactants can be employed to provide performance and dissolution. Preferred surfactants suitable for use with the compositions include, but are not limited to, amphoteric (including zwitterionic), anionic and/or nonionic cleaning surfactants and/or nonionic coating surfactants. The solid cleaning compositions include between about 1% by weight and about 60% by weight, between about 5% by weight and about 50% by weight, between about 5% by weight and about 40% by weight, between about 5% by weight and about 30% by weight, between about 1% by weight and about 25% by weight, between about 5% by weight and about 25% by weight, between about 5% by weight and about 20% by weight, or between about 5% by weight and about 15% by weight of the surfactants.

The use of cleaning surfactants and/or coating surfactants are disclosed. In embodiments the amphoteric surfactants are desirable cleaning surfactants providing the degreasing efficacy in the compositions. In embodiments the nonionic surfactants are desirable coating surfactants providing optimal dissolution of the compositions.

Amphoteric Surfactants—Cleaning Surfactants

Amphoteric, or ampholytic, surfactants contain both a basic and an acidic hydrophilic group and an organic hydrophobic group. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

The solid cleaning compositions include between about 0% by weight and about 40% by weight, between about 1% by weight and about 40% by weight, between about 5% by weight and about 40% by weight, between about 5% by weight and about 30% by weight, between about 5% by weight and about 25% by weight, between about 5% by weight and about 20% by weight, or between about 5% by weight and about 15% by weight of the amphoteric surfactants (including zwitterionic surfactants).

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia" Cosmetics & Toiletries, Vol. 104 (2) 69-71 (1989), which is herein incorporated by reference in its entirety. The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with chloroacetic acid or ethyl acetate. During alkylation, one or two carboxy-alkyl groups react to form a tertiary amine and an ether linkage with differing alkylating agents yielding different tertiary amines. Long chain imidazole derivatives generally have the general formula:

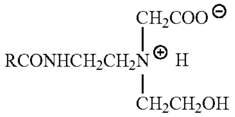

(MONO)ACETATE

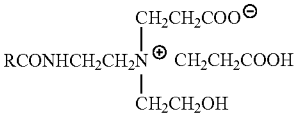

(DI)PROPIONATE

Neutral pH - Zwitterion

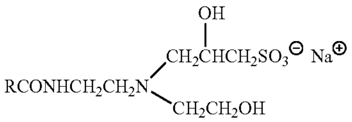

AMPHOTERIC SULFONATE wherein R is an acyclic hydrophobic group containing from about 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Amphocarboxylic acids can be produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reaction $RNH_2$, in which $R{=}C_8$-$C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes having application in this invention include alkyl beta-amino dipropionates, $RN(C_2H_4COOM)_2$ and $RNHC_2H_4COOM$. In an embodiment, R can be an acyclic hydrophobic group containing from about 8 to about 18 carbon atoms, and M is a cation to neutralize the charge of the anion.

Suitable amphoteric surfactants include those derived from coconut products such as coconut oil or coconut fatty acid. Additional suitable coconut derived surfactants include as part of their structure an ethylenediamine moiety, an alkanolamide moiety, an amino acid moiety, e.g., glycine, or a combination thereof; and an aliphatic substituent of from about 8 to 18 (e.g., 12) carbon atoms. Such a surfactant can also be considered an alkyl amphodicarboxylic acid. These amphoteric surfactants can include chemical structures represented as: $C_{12}$-alkyl-C(O)—NH—$CH_2$—$CH_2$—N+($CH_2$—$CH_2$—$CO_2Na)_2$—$CH_2$—$CH_2$—OH or $C_{12}$-alkyl-C(O)—N(H)—$CH_2$—$CH_2$—$N^+(CH_2$—$CO_2Na)_2$—$CH_2$—$CH_2$—OH. Disodium cocoampho dipropionate is one suitable amphoteric surfactant and is commercially available under the tradename Miranol™ FBS from Rhodia Inc., Cranbury, N.J. Another suitable coconut derived amphoteric surfactant with the chemical name disodium cocoampho diacetate is sold under the tradename Mirataine™ JCHA, also from Rhodia Inc., Cranbury, N.J.

Additional suitable surfactants include amine oxide surfactants having the formula:

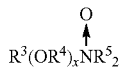

wherein $R^3$ is an alkyl, hydroxyalkyl, or alkyl phenyl group or mixtures thereof containing from about 8 to about 22 carbon atoms; $R^4$ is an alkylene or hydroxyalkylene group containing from about 2 to about 3 carbon atoms or mixtures thereof; x is from 0 to about 3; and each $R^5$ is an alkyl or hydroxyalkyl group containing from about 1 to about 3 carbon atoms or a polyethylene oxide group containing from about 1 to about 3 ethylene oxide groups. $R^5$ groups can be attached to each other, e.g., through an oxygen or nitrogen atom, to form a ring structure. Exemplary amine oxide surfactants are $C_{10}$-$C_{18}$ alkyldimethylamine oxides and $C_8$-$C_{12}$ alkoxyethyldihydroxyethylamine oxides. Further exemplary amine oxides include lauramine oxide, also referred to as Lauryldimethylamine oxide; Lauryldimethylamine N-oxide; Dodecyldimethylamine N-oxide; Dodecyldimethylamine oxide; $C_{14}H_{31}NO$.

A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch).

Zwitterionic Surfactants

Zwitterionic surfactants are a subset of the amphoteric surfactants and can include an anionic charge. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion; a negative charged carboxyl group; and an alkyl group. Zwitterionics generally contain cationic and anionic groups which ionize to a nearly equal degree in the isoelectric region of the molecule and which can develop strong "inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate.

Betaine and sultaine surfactants are exemplary zwitterionic surfactants for use herein. A general formula for these compounds is:

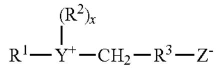

wherein $R^1$ contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R^2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P,P-diethyl-P-3,6,9-trioxatetracosanephosphonio]-2-hydroxypropane-1-phosphate; 3-[N,N-dipropyl-N-3-dodecoxy-2-hydroxypropyl-ammonio]-propane-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 4-[N,N-di(2(2-hydroxyethyl)-N(2-hydroxydodecyl)ammonio]-butane-1-carboxylate; 3-[S-ethyl-S-(3-dodecoxy-2-hydroxypropyl)sulfonio]-propane-1-phosphate; 3-[P,P-dimethyl-P-dodecylphosphonio]-propane-1-phosphonate; and S[N,N-di(3-hydroxypropyl)-N-hexadecylammonio]-2-hydroxy-pentane-1-sulfate. The alkyl groups contained in said detergent surfactants can be straight or branched and saturated or unsaturated.

The zwitterionic surfactant suitable for use in the present compositions includes a betaine of the general structure:

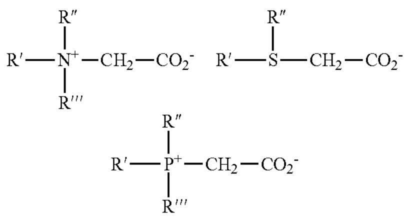

These surfactant betaines typically do not exhibit strong cationic or anionic characters at pH extremes nor do they show reduced water solubility in their isoelectric range. Unlike "external" quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12-16}$ acylamidopentanediethylbetaine; and $C_{12-16}$ acylmethylamidodimethylbetaine.

Particularly suitable sultaines include those compounds having the formula $(R(R^1)_2N^+R^2SO^{3-}$, in which R is a $C_6$-$C_{18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references is herein incorporated in their entirety.

In an embodiment, the solid hard surface cleaning compositions include an amine oxide and/or a betaine and/or a sultaine.

Anionic Surfactants—Cleaning Surfactants

The solid cleaning compositions can include at least one anionic surfactant as a cleaning surfactant. Anionics are those having a negative charge on the hydrophobe; or surfactants in which the hydrophobic section of the molecule carries no charge unless the pH is elevated to neutrality or above (e.g., carboxylic acids). Carboxylate, sulfonate, sulfate and phosphate are the polar (hydrophilic) solubilizing groups found in anionic surfactants. Of the cations (counter ions) associated with these polar groups, sodium, lithium and potassium impart water solubility; ammonium and substituted ammonium ions provide both water and oil solubility; and calcium, barium, and magnesium promote oil solubility. As those skilled in the art understand, anionics are excellent detersive surfactants and are therefore favored additions to heavy duty cleaning compositions.

Anionic sulfate surfactants suitable for use in the compositions include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkylpolysaccharides such as the sulfates of alkylpolyglucoside, and the like. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule). Anionic sulfonate surfactants suitable for use also include alkyl sulfonates, the linear and branched primary and secondary alkyl sulfonates, and the aromatic sulfonates with or without substituents.

Anionic carboxylate surfactants suitable for use include carboxylic acids (and salts), such as alkanoic acids (and alkanoates), ester carboxylic acids (e.g., alkyl succinates, such as sodium dioctyl sulfosuccinate), ether carboxylic acids, sulfonated fatty acids, such as sulfonated oleic acid, and the like. Such carboxylates include alkyl ethoxy carboxylates, alkyl aryl ethoxy carboxylates, alkyl polyethoxy polycarboxylate surfactants and soaps (e.g., alkyl carboxyls). Secondary carboxylates useful in the present compositions include those which contain a carboxyl unit connected to a secondary carbon. The secondary carbon can be in a ring structure, e.g., as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present. Suitable carboxylates also include acylamino acids (and salts), such as acylgluamates, acyl peptides, sarcosinates (e.g., N-acyl sarcosinates), taurates (e.g., N-acyl taurates and fatty acid amides of methyl tauride), and the like.

Suitable anionic surfactants include alkyl or alkylaryl ethoxy carboxylates of the following formula: $R—O—(CH_2CH_2O)_n(CH_2)_m—CO_2X$ (3) in which R is a $C_8$ to $C_{22}$ alkyl group or

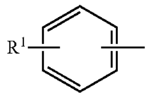
, in which $R^1$ is a $C_4$-$C_{16}$ alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a $C_8$-$C_{16}$ alkyl group. In some embodiments, R is a $C_{12}$-$C_{14}$ alkyl group, n is 4, and m is 1.

In other embodiments, R is

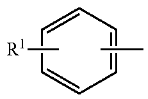

and $R^1$ is a $C_6$-$C_{12}$ alkyl group. In still yet other embodiments, $R^1$ is a $C_9$ alkyl group, n is 10 and m is 1.

Nonionic Surfactants—Cleaning and/or Coating Surfactants

The solid cleaning compositions can include at least one nonionic surfactant as a cleaning surfactant and/or a coating surfactant. Useful nonionic surfactants are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water soluble compound having the desired degree of balance between hydrophilic and hydrophobic properties. Useful nonionic surfactants include:

Polyethylene glycols (PEG) are products of condensed ethylene oxide and water that can have various derivatives and functions. PEGs are composed of polyether compounds repeating ethylene glycol units according to the constituent monomer or parent molecule (as ethylene glycol, ethylene oxide, or oxyethylene) as shown

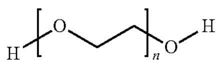

wherein n is any integer of at least 1. Preferably the PEG coating surfactant is a short chain PEG 200-800, such as PEG 200, PEG 400, PEG 600, or PEG 800.

Block polyoxypropylene-polyoxyethylene polymeric compounds based upon propylene glycol, ethylene glycol, glycerol, trimethylolpropane, and ethylenediamine as the initiator reactive hydrogen compound. Examples of polymeric compounds made from a sequential propoxylation and ethoxylation of initiator are commercially available from BASF Corp. One class of compounds are difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from about 1,000 to about 4,000. Ethylene oxide is then added to sandwich this hydrophobe between hydrophilic groups, controlled by length to constitute from about 10% by weight to about 80% by weight of the final molecule. Another class of compounds are tetra-functional block copolymers derived from the sequential addition of propylene oxide and ethylene oxide to ethylenediamine. The molecular weight of the propylene oxide hydrotype ranges from about 500 to about 7,000; and, the hydrophile, ethylene oxide, is added to constitute from about 10% by weight to about 80% by weight of the molecule.

Condensation products of one mole of alkyl phenol wherein the alkyl chain, of straight chain or branched chain configuration, or of single or dual alkyl constituent, contains from about 8 to about 18 carbon atoms with from about 3 to about 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names Igepal® manufactured by Rhone-Poulenc and Triton® manufactured by Union Carbide.

Condensation products of one mole of a saturated or unsaturated, straight or branched chain alcohol having from about 6 to about 24 carbon atoms with from about 3 to about 50 moles of ethylene oxide. The alcohol moiety can consist of mixtures of alcohols in the above delineated carbon range or it can consist of an alcohol having a specific number of carbon atoms within this range. Examples of like commercial surfactant are available under the trade names Lutensol™, Dehydol™ manufactured by BASF, Neodol™ manufactured by Shell Chemical Co. and Alfonic™ manufactured by Vista Chemical Co.

Condensation products of one mole of saturated or unsaturated, straight or branched chain carboxylic acid having from about 8 to about 18 carbon atoms with from about 6 to about 50 moles of ethylene oxide. The acid moiety can consist of mixtures of acids in the above defined carbon atoms range or it can consist of an acid having a specific number of carbon atoms within the range. Examples of commercial compounds of this chemistry are available on the market under the trade names Disponil or Agnique manufactured by BASF and Lipopeg™ manufactured by Lipo Chemicals, Inc.

In addition to ethoxylated carboxylic acids, commonly called polyethylene glycol esters, other alkanoic acid esters formed by reaction with glycerides, glycerin, and polyhydric (saccharide or sorbitan/sorbitol) alcohols have application in this invention for specialized embodiments, particularly indirect food additive applications. All of these ester moieties have one or more reactive hydrogen sites on their molecule which can undergo further acylation or ethylene oxide (alkoxide) addition to control the hydrophilicity of these substances. Care must be exercised when adding these fatty ester or acylated carbohydrates to compositions of the present invention containing amylase and/or lipase enzymes because of potential incompatibility.

Examples of nonionic low foaming surfactants include:

Compounds described herein that are modified, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from about 1,000 to about 3,100 with the central hydrophile including 10% by weight to about 80% by weight of the final molecule. These reverse Pluronics™ are manufactured by BASF Corporation under the trade name Pluronic™ R surfactants. Likewise, the Tetronic™ R surfactants are produced by BASF Corporation by the sequential addition of ethylene oxide and propylene oxide to ethylenediamine. The hydrophobic portion of the molecule weighs from about 2,100 to about 6,700 with the central hydrophile including 10% by weight to 80% by weight of the final molecule.

Compounds described herein that are modified by "capping" or "end blocking" the terminal hydroxy group or groups (of multi-functional moieties) to reduce foaming by reaction with a small hydrophobic molecule such as propylene oxide, butylene oxide, benzyl chloride; and, short chain fatty acids, alcohols or alkyl halides containing from 1 to about 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

Additional examples of effective low foaming nonionics include:

The alkylphenoxypolyethoxyalkanols of U.S. Pat. No. 2,903,486 issued Sep. 8, 1959 to Brown et al. and represented by the formula

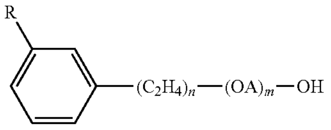

in which R is an alkyl group of 8 to 9 carbon atoms, A is an alkylene chain of 3 to 4 carbon atoms, n is an integer of 7 to 16, and m is an integer of 1 to 10.

The polyalkylene glycol condensates of U.S. Pat. No. 3,048,548 issued Aug. 7, 1962 to Martin et al. having alternating hydrophilic oxyethylene chains and hydrophobic oxypropylene chains where the weight of the terminal hydrophobic chains, the weight of the middle hydrophobic unit and the weight of the linking hydrophilic units each represent about one-third of the condensate.

The defoaming nonionic surfactants disclosed in U.S. Pat. No. 3,382,178 issued May 7, 1968 to Lissant et al. having the general formula $Z[(OR)_nOH]_z$ wherein Z is alkoxylatable material, R is a radical derived from an alkylene oxide which can be ethylene and propylene and n is an integer from, for example, 10 to 2,000 or more and z is an integer determined by the number of reactive oxyalkylatable groups.

The conjugated polyoxyalkylene compounds described in U.S. Pat. No. 2,677,700, issued May 4, 1954 to Jackson et al. corresponding to the formula $Y(C_3H_6O)_n(C_2H_4O)_mH$ wherein Y is the residue of organic compound having from about 1 to 6 carbon atoms and one reactive hydrogen atom, n has an average value of at least about 6.4, as determined by hydroxyl number and m has a value such that the oxyethylene portion constitutes about 10% to about 90% by weight of the molecule.

The conjugated polyoxyalkylene compounds described in U.S. Pat. No. 2,674,619, issued Apr. 6, 1954 to Lundsted et al. having the formula $Y[(C_3H_6O_n(C_2H_4O)_mH]_x$ wherein Y is the residue of an organic compound having from about 2 to 6 carbon atoms and containing x reactive hydrogen atoms in which x has a value of at least about 2, n has a value such that the molecular weight of the polyoxypropylene hydrophobic base is at least about 900 and m has value such that the oxyethylene content of the molecule is from about 10% to about 90% by weight. Compounds falling within the scope of the definition for Y include, for example, propylene glycol, glycerine, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

Additional conjugated polyoxyalkylene surface-active agents which are advantageously used in the compositions of this invention correspond to the formula: $P[(C_3H_6O)_n(C_2H_4O)_mH]_x$ wherein P is the residue of an organic compound having from about 8 to 18 carbon atoms and containing x reactive hydrogen atoms in which x has a value of 1 or 2, n has a value such that the molecular weight of the polyoxyethylene portion is at least about 44 and m has a value such that the oxypropylene content of the molecule is from about 10% to about 90% by weight. In either case the oxypropylene chains may contain optionally, but advantageously, small amounts of ethylene oxide and the oxyethylene chains may contain also optionally, but advantageously, small amounts of propylene oxide.

Polyhydroxy fatty acid amide surfactants suitable for use in the present compositions include those having the structural formula $R_2CON_{R1}Z$ in which: R1 is H, $C_1$-$C_4$ hydrocarbyl, 2-hydroxy ethyl, 2-hydroxy propyl, ethoxy, propoxy group, or a mixture thereof; $R_2$ is a $C_5$-$C_{31}$ hydrocarbyl, which can be straight-chain; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction; such as a glycityl moiety.

The alkyl ethoxylate condensation products of aliphatic alcohols with from about 0 to about 25 moles of ethylene oxide are suitable for use in the present compositions. The alkyl chain of the aliphatic alcohol can either be straight or branched, primary or secondary, and generally contains from 6 to 22 carbon atoms. The ethoxylated $C_6$-$C_{18}$ fatty alcohols and $C_6$-$C_{18}$ mixed ethoxylated and propoxylated fatty alcohols are suitable surfactants for use in the present compositions, particularly those that are water soluble. Suitable ethoxylated fatty alcohols include the $C_6$-$C_{18}$ ethoxylated fatty alcohols with a degree of ethoxylation of from 3 to 50.

Additional examples of alcohol ethoxylate nonionic surfactants are those that are capped, for example, halogen or benzyl capped. Some non-limiting examples of commercially available alcohol ethoxylate nonionic surfactants include the following: Dehypon LS 54 available from Henkel; Tomadol 91-6, Tomadol 1-9, Tomadol 1-5, and Tomadol 1-3 available from Tomah; Plurafac D-25, and SLF-18 available from BASF; Sasol C13-9EO, Sasol C8-10-6EO, Sasol TDA C13-6EO, and Sasol C6-10-12EO available from Sasol; Hetoxol 1-20-10 and Hetoxol 1-20-5 available from Laurachem; Huntsman L46-7EO available from Huntman; and Antarox BL 330 and BL 344 available from Rhodia, Pluronic N-3, Plurafac LF-221, Ls-36, Pluronic 25R2, Pluronic 10R5, Novel 1012 GB, Pluronic LD-097, Pluronic D-097, Neodol 25-12. Antarox BL 330 and BL 344 are either branched or straight chain C12-C18 halogen capped alcohol ethoxylate nonionic surfactants.

Suitable nonionic alkylpolysaccharide surfactants, particularly for use in the present compositions include those disclosed in U.S. Pat. No. 4,565,647, Llenado, issued Jan. 21, 1986. These surfactants include a hydrophobic group containing from about 6 to about 30 carbon atoms and a polysaccharide, e.g., a polyglycoside, hydrophilic group containing from about 1.3 to about 10 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units.

Fatty acid amide surfactants suitable for use the present compositions include those having the formula: $R_6CON(R_7)_2$ in which $R_6$ is an alkyl group containing from 7 to 21 carbon atoms and each $R_7$ is independently hydrogen, $C_1$-$C_4$ alkyl, $C_1$-$C_4$ hydroxyalkyl, or —$(C_2H_4O)_XH$, where x is in the range of from 1 to 3.

A useful class of non-ionic surfactants include the class defined as alkoxylated amines or, most particularly, alcohol alkoxylated/aminated/alkoxylated surfactants. These non-ionic surfactants may be at least in part represented by the general formulae: $R^{20}$—$(PO)_SN$-$(EO)_tH$, $R^{20}$—$(PO)_SN$-$(EO)_tH(EO)_tH$, and $R^{20}$—$N(EO)_tH$; in which $R^{21}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula: $R^{20}$—$(PO)_V$—N$[(EO)_wH][(EO)_zH]$ in which $R^{20}$ is as defined above, v is 1 to 20 (e.g., 1, 2, 3, or 4 (preferably 2)), and w and z are independently 1-10, preferably 2-5. These compounds are represented commercially by a line of products sold by Huntsman Chemicals as nonionic surfactants. A preferred chemical of this class includes Surfonic™ PEA 25 Amine Alkoxylate.

In an embodiment nonionic surfactants for the compositions include alcohol alkoxylates, alcohol ethoxylates, EO/PG block copolymers, and the like. Exemplary alcohol alkoxylates are shown in Table 2. In general alcohol alkoxylates have the following structure: R—O-$(EO)_m$—$(PO)_n$ where R is a hydrogen, alkyl, alkenyl or other aliphatic group, or an alkyl-aryl group of from 8 to 20, EO is oxyethylene, PO is oxypropylene, and m and n are independently integers in the range of 1 to 20. For example, a commercially available alcohol alkoxylate, such as Dehypon LS-54 (R—O-$(EO)_5(PO)_4$ where R is C12-C14) and Dehypon LS-36 (R—O-$(EO)_3(PO)_6$ where R is C12-C14).

TABLE 2

| | | |
|---|---|---|
| Surfactant A and/or | $R^1$—O—$(EO)_{x3}(PO)_{y3}$—H | wherein $R^1$ is a straight-chain $C_{10}$-$C_{16}$ alkyl, wherein $x_3$ is from 5 to 8, and wherein $y_3$ is from 2 to 5 |
| Surfactant A2 | $R^1$—O—$(EO)_{x4}(PO)_{y4}$—H | wherein $R^1$ is a straight-chain $C_{10}$-$C_{16}$ alkyl, wherein $x_4$ is from 4 to 6, and wherein $y_4$ is from 3 to 5 |
| Surfactant B | $R^2$—O—$(EO)_{x1}$—H | wherein $R^2$ is $C_{10}$-$C_{14}$ alkyl with an average of at least 2 branches per residue, and wherein $x_1$ is from 5 to 10 |
| Surfactant C | $R^2$—O—$(EO)_{x2}$—H | wherein $R^2$ is $C_{10}$-$C_{14}$ alkyl with an average of at least 2 branches per residue, and wherein $x_2$ is from 2 to 4 |
| Surfactant D | $R^7$—O—$(PO)y_5(EO)x_5(PO)y_6$—H | wherein $R^7$ is a branched $C_8$-$C_{16}$ Guerbet alcohol, $x_5$ is from 5 to 30, $y_5$ is from 1 to 4, and $y_6$ is from 10 to 20 |
| Surfactant E | $R^6$—O—$(PO)y_4(EO)x_4$—H ($R^6$ is $C_8$-$C_{16}$-guerbet) | wherein $R^6$ is a $C_8$-$C_{16}$ Guerbet alcohol, wherein $x_4$ is from 2 to 10, and wherein $y_4$ is from 1 to 2, |

Additional alcohol ethoxylate nonionic surfactants can include polymer surfactants, such as those shown in Table 3.

TABLE 3

| Surfactant | Polymer Surfactant | |
|---|---|---|
| F | 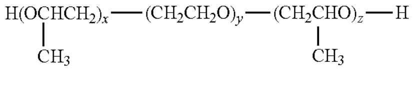 | Where x = 12-20, y = 120-220, z = 12-20 |

TABLE 3-continued

| Surfactant | Polymer Surfactant | |
|---|---|---|
| G | $HO—(CH_2CH_2O)_x—(CH_2CHO)_y—(CH_2CH_2O)_z—H$<br>$CH_3$ (on $CH_2CHO$) | Where x = 88-108, y = 57-77, z = 88-108 |
| H | $H(OCHCH_2)_x—(CH_2CH_2O)_y—(CH_2CHO)_z—H$<br>$CH_3$ (on $OCHCH_2$), $CH_3$ (on $CH_2CHO$) | Where x = 15-25, y = 10-25, z = 15-25 |
| I | $R^4—O—(EO)_x(XO)_y—H$ | Where R4 = C13-C15 alkyl, x = 8-10, y = 1-3, and XO = Butylene oxide |
| J | $R^5—O—(EO)_x(PO)_y—H$ | Where R5 = C12-15 alkyl, x = 3-5, y = 5-7 |

Preferred nonionic surfactants include alcohol alkoxylates with less than 10 EO groups for enhanced tablet stability and preferred dissolution rate. In an embodiment, the alcohol alkoxylate comprises less than 10 EO groups, less than 9 EO groups, less than 8 EO groups, less than 7 EO groups, less than 6 EO groups, or less than 5 EO groups. In an embodiment, the alcohol alkoxylate comprises from 1 to 10 EO groups, from 1 to 9 EO groups, from 1 to 8 EO groups, from 1 to 7 EO groups, from 1 to 6 EO groups, from 1 to 5 EO groups, from 1 to 4 EO groups, or from 1 to 3 EO groups.

The treatise *Nonionic Surfactants*, edited by Schick, M. J., Vol. 1 of the Surfactant Science Series, Marcel Dekker, Inc., New York, 1983 is an excellent reference on the wide variety of nonionic compounds generally employed in the practice of the present invention. A typical listing of nonionic classes, and species of these surfactants, is given in U.S. Pat. No. 3,929,678 issued to Laughlin and Heuring on Dec. 30, 1975. Further examples are given in "Surface Active Agents and detergents" (Vol. I and II by Schwartz, Perry and Berch). Additional nonionic surfactants can include those often defined as semi-polar nonionic surfactants, the disclosure of which in U.S. Patent Publication No. 2018-0110220 which is herein incorporated by reference in its entirety.

Coating Surfactants

The solid cleaning compositions include between about 0% by weight and about 25% by weight, between about 1% by weight and about 25% by weight, between about 5% by weight and about 20% by weight, between about 5% by weight and about 15% by weight, or between about 5% by weight and about 10% by weight of the coating surfactants comprising nonionic and/or polymeric surfactants.

Additional Functional Ingredients

The components of the solid cleaning composition can further be combined with various functional components suitable for uses disclosed herein. In some embodiments, the solid cleaning compositions including the alkalinity source, acid, water conditioning agent, and surfactants make up a large amount, or even substantially all of the total weight of the compositions. For example, in some embodiments few or no additional functional ingredients are disposed therein.

In other embodiments, additional functional ingredients may be included in the compositions. The functional ingredients provide desired properties and functionalities to the compositions. For the purpose of this application, the term "functional ingredient" includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and that a broad variety of other functional ingredients may be used. For example, many of the functional materials discussed below relate to materials used in cleaning. However, other embodiments may include functional ingredients for use in other applications.

In some embodiments, the solid cleaning compositions may include optical brighteners, defoaming agents, anti-redeposition agents, bleaching agents, solubility modifiers, dispersants, metal protecting agents, soil antiredeposition agents, stabilizing agents, preservatives, dissolution aids, corrosion inhibitors, builders/sequestrants/chelating agents, enzymes, aesthetic enhancing agents including fragrances and/or dyes, additional rheology and/or solubility modifiers or thickeners, hydrotropes or couplers, buffers, solvents, additional cleaning agents and the like.

In some embodiments, the solid cleaning composition does not comprise an enzyme.

According to embodiments of the invention, the various additional functional ingredients may be provided in a composition in the amount from about 0 wt-% and about 50 wt-%, from about 0 wt-% and about 40 wt-%, from about 0 wt-% and about 30 wt-%, from about 0.01 wt-% and about 30 wt-%, from about 0.1 wt-% and about 30 wt-%, from about 1 wt-% and about 30 wt-%, from about 1 wt-% and about 25 wt-%, from about 1 wt-% and about 20 wt-%, from about 1 wt-% and about 15 wt-%, or from about 1 wt-% and about 10 wt-%. In addition, without being limited according to the invention, all ranges recited are inclusive of the numbers defining the range and include each integer within the defined range.

In some embodiments, preservatives, biocides, and/or dyes are included in the solid compositions. Preferred preservatives include Kathon™ CG from Lanxess. Preferred biocides include Kathon™ 86F from Lanxess. In some embodiments, the solid compositions comprise from about 0 to about 1 wt-% of a dye, from about 0 to about 0.5 wt-% of a dye, from about 0 to about 0.1% of a dye, or from about 0.01 wt-% to about 0.1 wt-% of a dye. In some embodiments, the solid compositions comprise from about 0 to about 5 wt-% of a preservative, from about 0 to about 4 wt-% of a preservative, from about 0 to about 3% of a preservative, from about 0 to about 2 wt-% of a preservative, from 0 to about 1 wt-% of a preservative, or from about 0.01 wt-% to about 1.5 wt-% of a preservative. In some embodiments, the solid compositions comprise from about 0 to about 5 wt-% of a biocide, from about 0 to about 4 wt-% of a biocide, from about 0 to about 3% of a biocide, from about 0 to about 2 wt-% of a biocide, from 0 to about 1 wt-% of a biocide, or from about 0.01 wt-% to about 1.5 wt-% of a biocide.

In some embodiments, the solid compositions have a water content of less than about 15% by weight, less than about 10% by weight, less than about 5% by weight, less than about 1% by weight, less than about 0.5% by weight, or less than about 0.1% by weight. In some embodiments, the solid compositions do not include water as a raw material; however, water can be included in components of the solid compositions.

Corrosion Inhibitors

The solid cleaning compositions can include one or more corrosion inhibitors for use for in cleaning of alkaline sensitive metals such as aluminum or aluminum containing alloys. The corrosion inhibitors must not negatively interfere with the solid and/or use composition stability Preferred corrosion inhibitors that maintain stability of the compositions include silicates and metasilicates, preferably alkali metal silicates and metasilicates, such as sodium silicate and sodium metasilicate. Anhydrous forms may be employed such as sodium metasilicate anhydrous.

Additional exemplary corrosion inhibitors include for example, an imidazoline compound, a quaternary ammonium compound, a pyridinium compound, or a combination thereof. Still further exemplary corrosion inhibitors can include for example a phosphate ester, monomeric or oligomeric fatty acid, alkoxylated amine, or mixture thereof. Disclosure of such exemplary corrosion inhibitors are set forth in U.S. application Ser. No. 16/775,417, the entire content of which are incorporated by reference herein in its entirety.

In some embodiments, the solid hard surface cleaning compositions include between about 0 wt-% to about 10 wt-% corrosion inhibitor, between about 0.01 wt-% to about 10 wt-% corrosion inhibitor, between about 0.01 wt-% to about 5 wt-% corrosion inhibitor, between about 0.1 wt-% to about 10 wt-% corrosion inhibitor, between about 0.1 wt-% to about 8 wt-% corrosion inhibitor, or between about 1 wt-% to about 8 wt-% corrosion inhibitor.

Solid Compositions

The solid cleaning compositions are substantially homogeneous with regard to the distribution of ingredients throughout its mass and is dimensionally stable. The solid hard surface cleaning compositions are hardened compositions that will not flow and will substantially retain its shape under moderate stress or pressure or mere gravity. The degree of hardness of the solid hard surface cleaning composition may range from that of a fused solid block which is relatively dense and hard, for example, like concrete, to a consistency characterized as being a hardened paste. In addition, the term "solid" refers to the state of the solid hard surface cleaning composition under the expected conditions of storage and use. In general, it is expected that the solid hard surface cleaning composition will remain in solid form when exposed to temperatures of up to about 100° F. and preferably greater than about 120° F. The solids are dimensionally stable, meaning the solids do not swell (or change in dimension due to swelling), this is measured according to a swelling of less than about 10-15% at temperatures of up to 50° C. (or 100° F.) for at least 8 weeks. Such solid tablets are referred to as dimensionally stable.

The solid hard surface cleaning composition may take forms including, but not limited to a pressed solid; a cast solid block; an extruded, molded or formed solid pellet, block, tablet, powder, granule, flake; or the formed solid can thereafter be ground or formed into a powder, granule, or flake.

In certain embodiments, the solid cleaning composition could be provided in the form of a unit dose. A unit dose refers to a composition unit sized so that the entire unit is used during a single cleaning cycle. When the solid hard surface cleaning composition is provided as a unit dose, it is preferably provided as a pressed solid, cast solid, an extruded pellet, or a tablet having a size of between approximately 1 gram and approximately 50 grams.

Methods of Use

The solid compositions disclosed herein are particularly suitable for replacing liquid compositions and beneficially providing at least a substantially similar (or in some embodiments a higher) concentration of surfactants in comparison to a liquid composition to provide enhanced cleaning performance against various soils, including greasy difficult to remove soils. Moreover, the compositions further beneficially provide a solid having optimal dissolution rate for a customer or user of the solid composition to dissolve the solid for a use solution in a short period of time, such as less than about 20 minutes, less than about 15 minutes, or less than about 10 minutes.

The solid compositions dissolve to provide stable use compositions that quickly dissolve in water and form a stable, clear use solution. The stable use compositions do not exhibit precipitation upon storage and/or use. Moreover, neither the solid compositions nor the liquid use compositions require use of personal protective equipment (PPE) as they are safe for contact, including skin and eyes.

The use compositions can be applied as concentrate compositions or further diluted. The use composition can be applied to a variety of surfaces as it is a multi-use formulation. The solid cleaning compositions are particularly suitable for cleaning hard surfaces. Suitable hard surfaces include those soiled with food soils, including food preparation surfaces that are heavily including with greasy soils. Various kitchen hygiene and hard surface applications are suitable for use of the use compositions.

Exemplary food preparation surfaces include surfaces in a restaurant, surfaces in a grocery store, and/or a household surfaces. In addition, various floor cleaning surfaces are included for use of the hard surface cleaning composition, including for example floors in kitchens, restaurants, the like, and/or drive-thrus. Despite the exclusion of hydroxide alkalinity sources from the compositions, the hard surface cleaning compositions disclosed herein containing carbonate alkalinity and solidification matrix provide effective removal of food soils, including baked on soils such as polymerized fats and oils.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

The following materials were utilized in the Examples:

Acusol® 445 ND: a polycarboxylic acid, sodium salt of acrylic polymer (sodium polyacrylate), partially neutralized available from Dow Chemical.

Aerosol OT-75®: sodium dioctyl sulfosuccinate, 75% in water/ethanol, available from Solvay.

Amine Oxide Granules: C12 amine oxide, 95%

Barlox 10S®: C10 amine oxide, 30%, available from Lonza.

Barlox 12®: C12 amine oxide, Lauramine Oxide 30% (lauryldimethlamine oxide (30%)), available from Lonza.

Bioterge® AS-90: alpha olefin sulfonate anionic surfactant (sodium C14-C16 alpha olefin sulfonate), AOS beads, available from Stepan.

Dehypon® LS 36: C12-14 alcohol alkoxylate, 3 EO, 6 PO, available from BASF Corporation.

Dehypon® LS 54: C12-14 alcohol alkoxylate, 5 EO, 4 PO, available from BASF Corporation.

Ecosurf EH-6®: 2-ethyl hexanol, EO-PO nonionic surfactant, available from Dow Chemical.

Ecosurf™ EH-9: 2-ethyl hexanol EO-PO, 9EO, available from Dow Chemical

Glucopon 50 G®: C10-16 Polyglucoside, available from BASF Corporation.

Glucopon 215 UP®: C8-10 Polyglucoside, 63.5%; available from BASF Corporation.

Glucopon 225 DK®: C8-10 Polyglucoside, 70%; available from BASF Corporation.

Glucopon 425 N®: C8-10 Polyglucoside, 25-35%/C10-16 Polyglucoside, 15-25%; available from BASF Corporation.

Lutensol® XL 70: C10-Guerbet alcohol alkoxylate, 7 EO, available from BASF Corporation Lutensol® XL 90: C10-Guerbet alcohol alkoxylate, 9 EO, available from BASF Corporation PEG 400: polyethylene glycol 400 mw, available from multiple sources.

Pluronic 25R2®: PO-EO-PO Block co-polymer, available from BASF Corporation.

Plurafac LF 902®: alcohol alkoxylate surfactant, available from BASF Corporation.

Pylaklor Bright Amethyst LX-12379, available from Pylam Dyes.

Pylaklor New Alkali Purple LS-10695, available from Pylam Dyes.

Pylaklor Bright Violet LS-10966, available from Pylam Dyes.

Solid Betaine: cocoamidopropyl betaine, 75%

Tomadol 91-6®: C9-11 linear alcohol ethoxylate, 6 EO, available from multiple sources.

Trilon M® granules: trisodium salt of methylglycinediacetic acid, N, N-bis(carboxymethyl)-tri-sodium salt, available from BASF.

Ufaryl DL 90 C®: Sodium dodecylbenzenesulfonate, 90%, powder, available from Unger.

Commodity or widely commercially available materials: light ash (sodium carbonate), citric acid, sodium bicarbonate, sodium silicate, propylene glycol, and glycerin.

Example 1

Dissolution Testing. Exemplary solid cleaning compositions were prepared as pressed tablets by pressing 3 g of powdered formula into a 20 mm tablet mold for 30 seconds at about 500 psi. The tablets were then dropped into a 1-liter beaker filled with 500 mL of 5 gpg water and timed until the tablets were completely broken apart. From this testing, three mitigation strategies were found to aid in decreasing the dissolution of the tablet, or the time it takes for the tablet to dissolve in water: the addition of an acid (e.g. citric acid), utilizing a coating surfactant, and cleaning surfactant selection.

The addition of an acid was evaluated to determine impact on dissolution rate of the solid tablet. Evaluated tablet formulas are shown in Tables 4-5.

TABLE 4

| Description | 0% Citric Acid (wt-%) | 10% Citric Acid (wt-%) | 20% Citric Acid (wt-%) |
|---|---|---|---|
| Light Ash | 30-60 | 30-60 | 30-60 |
| Trilon M ® Granules | 5-15 | 5-15 | 5-15 |
| Acusol ® 445 ND | 1-10 | 1-10 | 1-10 |
| Barlox 12 ® | 5-15 | 5-15 | 5-15 |
| Bioterge-AS90 ® Beads (AOS) | 10-30 | 10-30 | 10-30 |
| Organic Acid | 0 | 10 | 20 |
| Sodium Bicarbonate | 1-5 | 1-5 | 1-5 |
| Sodium Silicate Powder | 1-5 | 1-5 | 1-5 |
| Total | 100 | 100 | 100 |

TABLE 5

| Description | 10% Citric Acid (wt-%) | 15% Citric Acid (wt-%) | 20% Citric Acid (wt-%) |
|---|---|---|---|
| Light Ash | 35-65 | 35-65 | 35-65 |
| Trilon M ® Granules | 5-15 | 5-15 | 5-15 |
| Acusol ® 445 ND | 1-10 | 1-10 | 1-10 |
| Barlox 12 ® | 5-15 | 5-15 | 5-15 |
| Organic Acid | 10 | 15 | 20 |
| Sodium Bicarbonate | 1-5 | 1-5 | 1-5 |
| Sodium Silicate Powder | 1-5 | 1-5 | 1-5 |
| Total | 100 | 100 | 100 |

Figure 2:
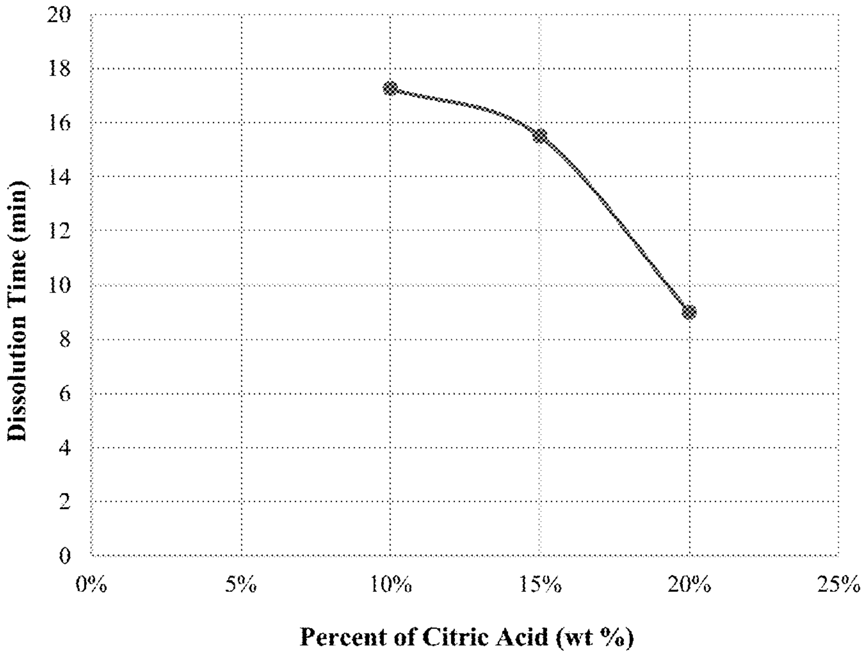
FIG. 2 shows a graph comparing the dissolution time of evaluated solid cleaning compositions with different percentages of added citric acid.

As seen in FIG. 1, tablet formulas composed according to Table 4, with increasing amounts of citric acid exhibited significantly decreased dissolution times. With the addition of 10% citric acid, the dissolution time decreased by more than half and continued to decrease with 20% citric acid. The dissolution times of tablet formulas 10-20% citric acid (see Table 5) were further tested, as shown in FIG. 2. The increase in citric acid decreased dissolution time due to the resulting reaction between the acid and the base within the formula, creating effervescence that physically broke up the tablet faster. In addition the inclusion of the AOS surfactant significantly increased dissolution time of the solid tablet.

These results show the benefit of including an acid, such as citric acid into the solid cleaning composition. The desired dissolution time of less than about 10 minutes provides a significant commercial advantage that is highly desirable by consumers.

Example 2

Additional dissolution testing was conducted to evaluate the use of a coating surfactant as mentioned in Example 1. The addition of a coating surfactant was evaluated in formulations shown in Table 6 where the coating surfactant was added after the light ash, allowing the ash to be coated in that surfactant. This addition to wet particles provides desirable adhesion and prevents hydrates from forming that would hold the solid composition together.

TABLE 6

| Description | 0% Coating Surfactant (wt-%) | 5% Coating Surfactant (wt-%) | 10% Coating Surfactant (wt-%) |
|---|---|---|---|
| Light Ash | 30-60 | 30-60 | 30-60 |
| PEG 400 or Pluronic 25R2 or Propylene glycol or Glycerin | 0 | 5 | 10 |
| Trilon M ® Granules | 5-15 | 5-15 | 5-15 |
| Acusol ® 445 ND | 1-10 | 1-10 | 1-10 |
| Barlox 12 ® | 5-15 | 5-15 | 5-15 |
| Bioterge-AS90 ® Beads (AOS) | 10-30 | 10-30 | 10-30 |
| Sodium Bicarbonate | 1-5 | 1-5 | 1-5 |
| Sodium Silicate Powder | 1-5 | 1-5 | 1-5 |

TABLE 7

| Description | 3% PEG 400 (wt-%) | 6% PEG 400 (wt-%) | 8% PEG 400 (wt-%) |
|---|---|---|---|
| Light Ash | 30-60 | 30-60 | 30-60 |
| PEG 400 | 3 | 6 | 8 |
| Trilon M ® Granules | 5-15 | 5-15 | 5-15 |
| Acusol ® 445 ND | 1-10 | 1-10 | 1-10 |
| Barlox 12 ® | 5-15 | 5-15 | 5-15 |
| Organic Acid | 20 | 20 | 20 |
| Sodium Bicarbonate | 1-5 | 1-5 | 1-5 |
| Sodium Silicate Powder | 1-5 | 1-5 | 1-5 |

Figure 3:
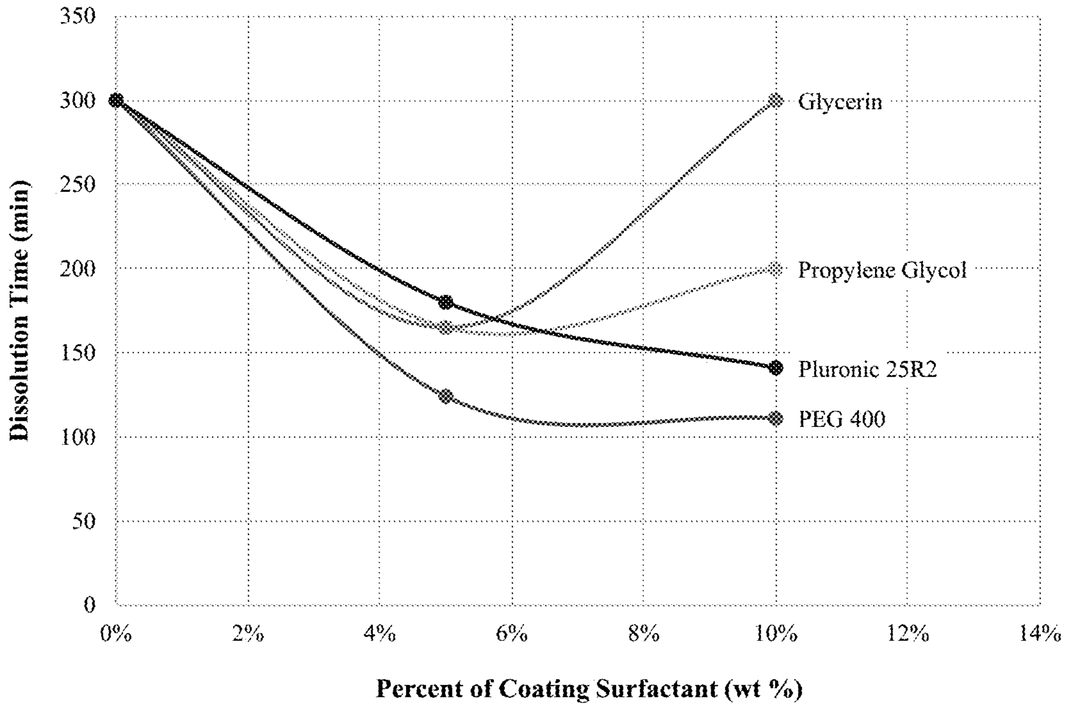
FIG. 3 shows a graph comparing the dissolution time of evaluated solid cleaning compositions with different coating surfactants with varying weight percentages.
Figure 4:
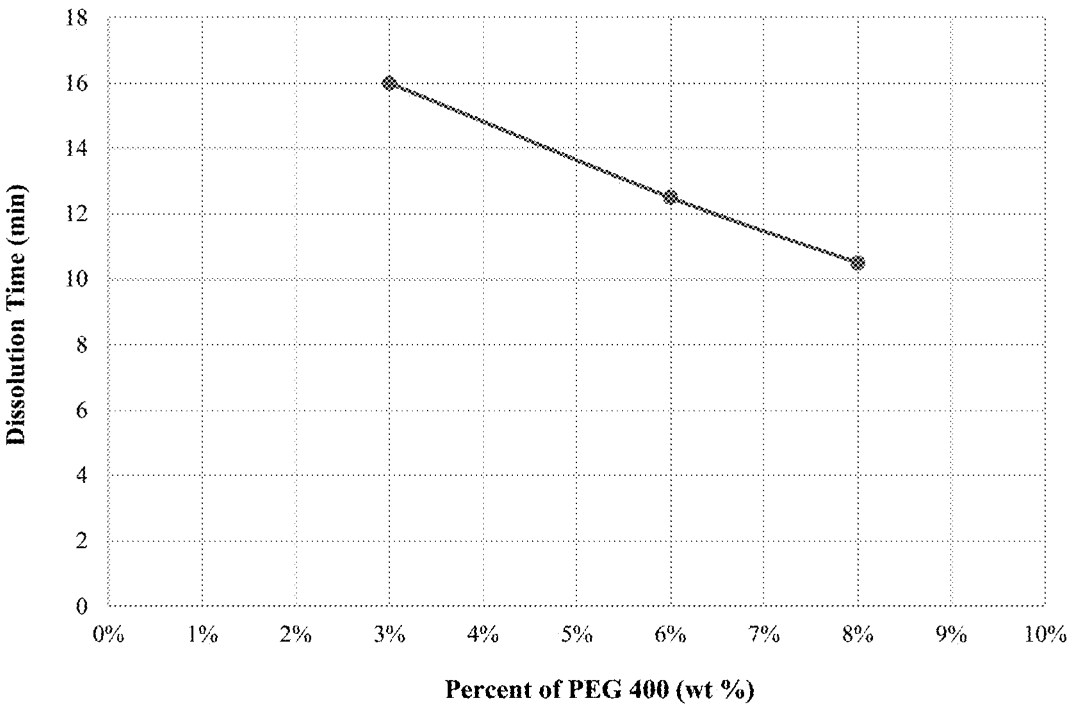
FIG. 4 shows a graph comparing the dissolution time of evaluated solid cleaning compositions with varying weight percentages of an exemplary coating surfactant, PEG 400.

The different coating surfactants were tested at increasing percent weight, as shown in FIG. 3. While all coating surfactants showed a decrease in dissolution time of the tablets at 5%, only two (Pluronic 25R2® and PEG 400) continued to show decreasing dissolution time at higher percentages. There appears to be diminishing return when significantly exceeding about 10 wt-% of the coating surfactant. This use of a coating surfactant generally resulted in lower dissolution times, which may be due to reduced binding of the ash when coated. PEG 400 showed the most reduced dissolution time of the coating surfactants in FIG. 3, which prompted further testing shown in FIG. 4. Increasing the percentage of PEG 400 in the tablet formulation, according to Table 7, further decreased the dissolution time of the tablet as shown by the graph in FIG. 4. In this particular embodiment the PEG did not exceed 8% due to the tablet approaching the maximum amount of liquid in the formulation that could be pressed. Additional modifications to the tablet could allow additional PEG wt-% to be added without experiencing weeping. Additionally, if the solid compositions were to be cast or extruded solids—instead of pressed solids—additional coating surfactant could be employed beyond the data demonstrated in this example.

Example 3

Figure 5:
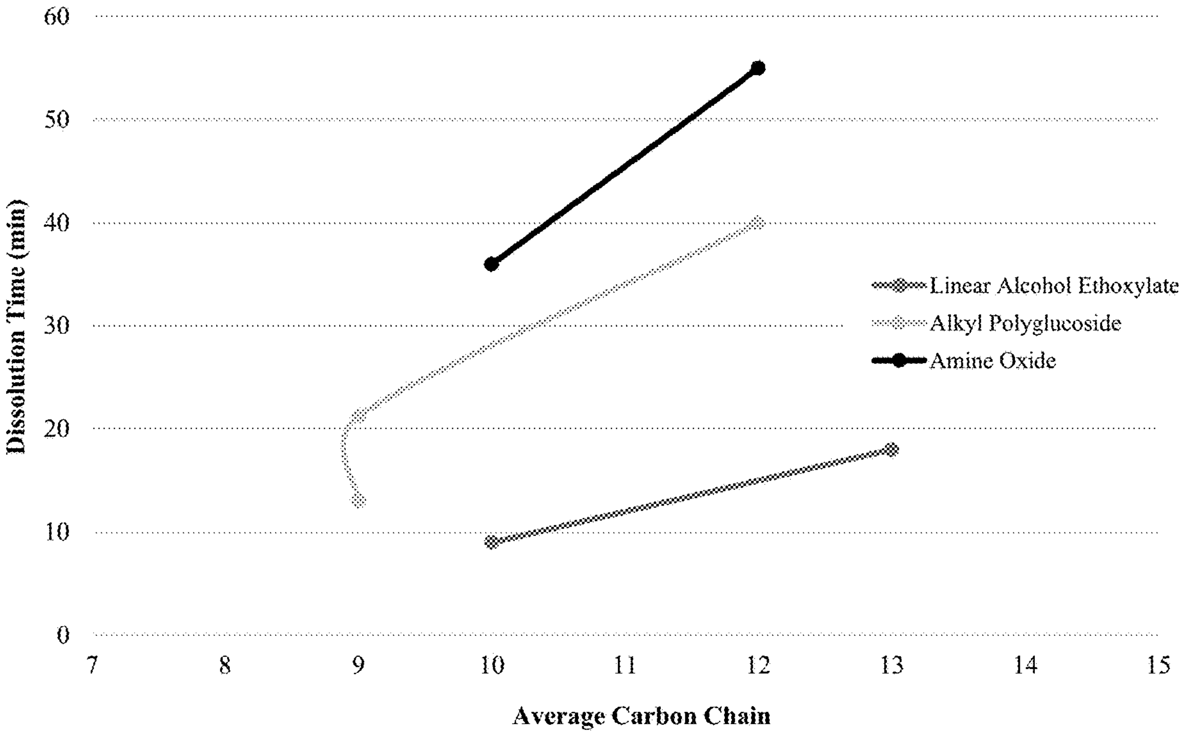
FIG. 5 shows a graph comparing the dissolution time of evaluated solid cleaning compositions with different surfactant classes.

The impact of surfactant selection was further evaluated. The type of surfactant added to the formulation plays a role in lowering dissolution times. Formulas utilizing different surfactants were composed according to Table 8, and the effects of dissolution time on the resulting tablets is shown in FIG. 5. In FIG. 5, the surfactants are separated by surfactant class and average carbon chain lengths based on literature reported values of chain length. In each surfactant class (lines in the graph) where more than one surfactant was tested, it was observed that with liquid surfactants, much of the time surfactants with lower carbon chain lengths had lower dissolution times. It was also found that different classes of surfactants could have different dissolution times even though they may have similar carbon chain lengths. For example, while both the C10 amine oxide (Barlox 10S) and the C10 alcohol ethoxylate (Tomadol 91-6) have similar average carbon chain lengths, the alcohol ethoxylate has a significantly lower dissolution time which can be attributed to structural differences.

This data shows the benefit of a lower carbon chain, such as C10 or less when using the cleaning surfactant as a standalone surfactant in the cleaning composition. In particular, when the cleaning surfactant is provided as a liquid raw material for formulating into the solid composition, the lower carbon chain, such as C10 or less, is important for ensuring the optimal low dissolution time of less than about 10 minutes. However, the surfactants added in a dry granulate form are not constrained to the lower carbon chain threshold.

As described herein either a cleaning surfactant, coating surfactant, or combination of cleaning surfactant and coating surfactant can be included in the formulations. In some embodiments, the cleaning surfactant is a nonionic surfactant and then further serves the purpose of a coating surfactant.

TABLE 8

| Description | Formula Weight % |
|---|---|
| Light Ash | 30-60 |
| Trilon M ® Granules | 5-15 |
| Acusol ® 445 ND | 1-10 |
| Cleaning and/or Coating Surfactant | 10 |
| Organic Acid | 20 |
| Sodium Bicarbonate | 1-5 |
| Sodium Silicate | 1-5 |

Various cleaning and/or coating surfactants can be employed, such as for example Tomadol 91-6® or Glucopon 215 UP® or Glucopon 225 DK® or Glucopon 425 N® or Ecosurf EH-6® or Plurafac LF 902® or Barlox 10S® or Barlox 12®, the classifications of each surfactant are described in the Materials for the Examples.

Figure 6:
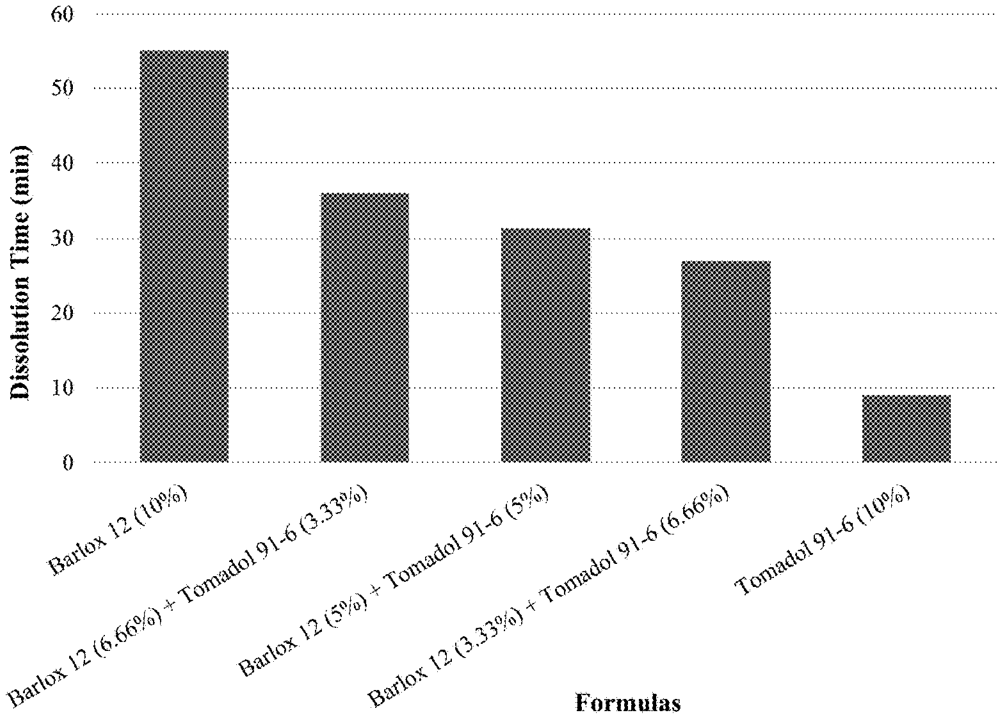
FIG. 6 shows a graph comparing the dissolution time of evaluated solid cleaning compositions with varying ratios of two exemplary surfactants, Barlox 12® and Tomadol® 91-6.
Figure 7:
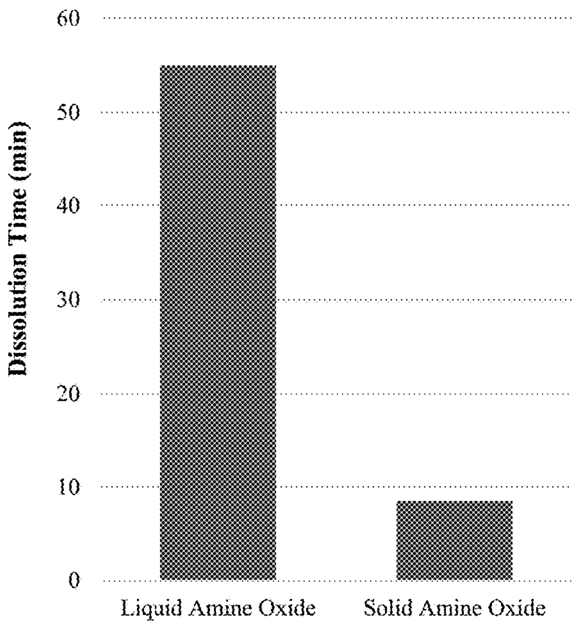
FIG. 7 shows a graph comparing the dissolution time of evaluated solid cleaning compositions which used a liquid amine oxide and a solid amine oxide.

Further, in FIG. 6, one can see the difference in dissolution time between Barlox 12® and Tomadol 91-6® and how the ratios between these surfactants contributes to the dissolution time. The formulations of the compositions shown in FIG. 6 can be found in Table 9. FIG. 6 shows that as the proportion of Tomadol 91-6 having the shorting chain length increases, then dissolution time decreases. It was additionally found that the physical form of the surfactants (either liquid or solid) played a large role in the dissolution time. As seen in FIG. 7, the formula containing liquid amine oxide surfactant (Barlox 12®) had a significantly higher dissolution time compared to the solid amine oxide surfactant (amine oxide granules), the formulations of which are shown in Table 10.

TABLE 9

| Description | Barlox 12 ® | 2:1 Ratio | 1:1 Ratio | 1:2 Ratio | Tomadol 91-6 ® |
|---|---|---|---|---|---|
| Light Ash | 30-60 | 30-60 | 30-60 | 30-60 | 30-60 |
| Trilon M ® Granules | 5-15 | 5-15 | 5-15 | 5-15 | 5-15 |
| Acusol ® 445 ND | 1-10 | 1-10 | 1-10 | 1-10 | 1-10 |
| Barlox 12 ® | 10 | 6.66 | 5 | 3.33 | |
| Tomadol 91-6 ® | | 3.33 | 5 | 6.66 | 10 |
| Organic Acid | 20 | 20 | 20 | 20 | 20 |

TABLE 9-continued

| Description | Barlox 12 ® | 2:1 Ratio | 1:1 Ratio | 1:2 Ratio | Tomadol 91-6 ® |
|---|---|---|---|---|---|
| Sodium Bicarbonate | 1-5 | 1-5 | 1-5 | 1-5 | 1-5 |
| Sodium Silicate | 1-5 | 1-5 | 1-5 | 1-5 | 1-5 |

TABLE 10

| Description | Liquid Amine Oxide | Solid Amine Oxide |
|---|---|---|
| Light Ash | 3-60 | 3-60 |
| Trilon M ® Granules | 5-15 | 5-15 |
| Acusol ® 445 ND | 1-10 | 1-10 |
| Barlox 12 ® | 10 | — |
| Amine oxide granules | — | 10 |
| Organic Acid | 20 | 20 |
| Sodium Bicarbonate | 1-5 | 1-5 |
| Sodium Silicate | 1-5 | 1-5 |

Example 4

Figure 8:
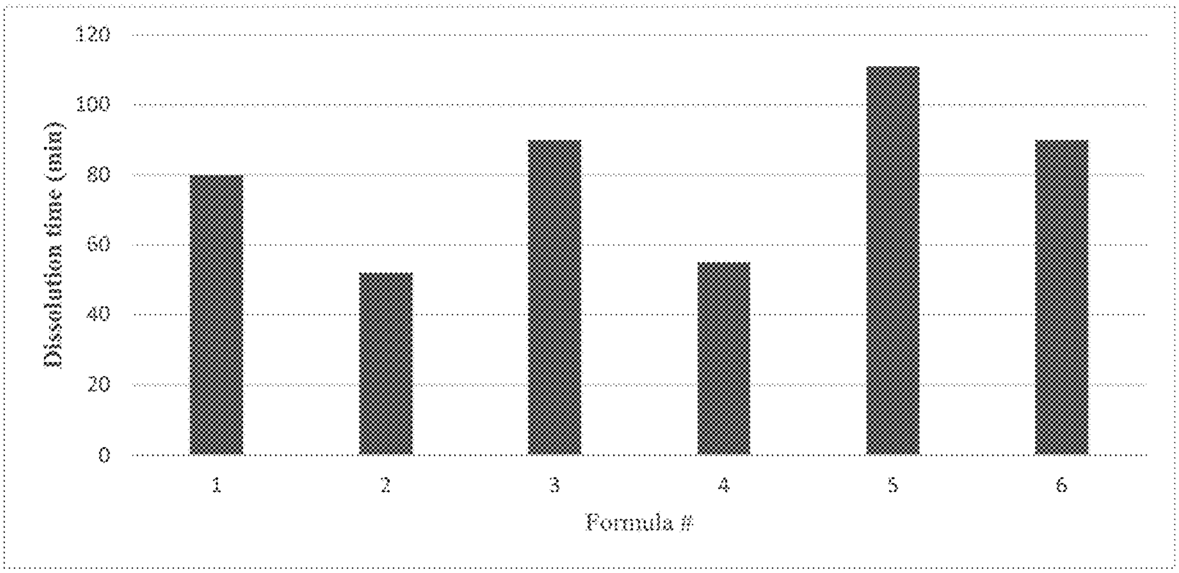
FIG. 8 shows a graph comparing the dissolution time of evaluated solid cleaning compositions which included or did not include a sulfonated surfactant.

Additional dissolution testing was conducted and showed formulations made with and without sulfonated surfactants. Formulations were made according to Table 11, with formulas 1, 3, and 5 including Bioterge AS-90® Beads (AOS). As seen in FIG. 8, each pair of formulations demonstrate that the removal of the sulfonated surfactant, results in a reduction in the dissolution time of the tablet. Formula 1 (20% isononanoate) dissolved in 80 minutes, but without AOS, the formulation (Formula 2) dissolved in 52 minutes. Similarly, the 20% citric acid formulations (Formulas 3 & 4) and the Ash coated in PEG400 (Formula 5&6) without AOS dissolved quicker than the formulation with AOS (Formula 3 dissolved in 90 minutes, Formula 4 dissolved in 55 minutes, Formula 5 dissolved in 111 minutes, and Formula 6 dissolved in 90).

TABLE 11

| Description | 1 | 2 | 3 | 4 | 5 | 6 |
|---|---|---|---|---|---|---|
| Light Ash | 30-60 | 30-60 | 30-60 | 30-60 | 30-60 | 30-60 |
| PEG400 | 0 | 0 | 0 | 0 | 10 | 11.11 |
| Trilon M ® Granules | 5-15 | 5-15 | 5-15 | 5-15 | 5-15 | 5-15 |
| Acusol ® 445 ND | 1-10 | 1-10 | 1-10 | 1-10 | 1-10 | 1-10 |
| Barlox 12 ® | 5-15 | 5-15 | 5-15 | 5-15 | 5-15 | 5-15 |
| Organic Acid | 0 | 0 | 20 | 20 | 0 | 0 |
| Bioterge AS-90 ® beads | 20 | 0 | 20 | 0 | 20 | 0 |
| Colatrope ® | 20 | 20 | 0 | 0 | 0 | 0 |
| Sodium Bicarbonate | 1-5 | 1-5 | 1-5 | 1-5 | 1-5 | 1-5 |
| Sodium Silicate | 1-5 | 1-5 | 1-5 | 1-5 | 1-5 | 1-5 |

Each pair of formulations demonstrate that the removal of the sulfonated surfactant, in this case AOS, results in a reduction in the dissolution time of the tablet. This is further summarized in Table 12.

TABLE 12

| Formula # | Description | Dissolution Time (min) |
|---|---|---|
| 1 | 20% isononanoate | 80 |
| 2 | 20% isononanoate, no AOS | 52 |
| 3 | 20% organic acid | 90 |
| 4 | 20% organic acid, no AOS | 55 |
| 5 | Ash coated in PEG400 (10%) | 111 |
| 6 | Ash coated with PEG400 (11.1%), no AOS | 90 |

Example 5

Foam testing was evaluated to compare solid cleaning compositions prepared as powders and made into ready to use solutions then tested for their foam height as shown in Table 13. The formulas were tested in 5 gpg water at the concentration of 0.0127 g/mL (equal to three 3 g tablets per 710 mL) and were measured for foam height over a period of 6 minutes following test methodology for Manual Detergent Test Procedure Cylinder Foam Test Method where test solution were prepared and 40 mL test solution was added to a 250 ml graduated cylinder. The step was repeated for each product and all cylinders were labeled. The next steps were to loosen stoppers and heat cylinders containing solutions to 80° F. and a second set to 110° F. Then soils (45% Crisco shortening, 30% flour, 15% powdered egg, 10% oleic) were liquefied on a low temperature hot plate set at 104° F. Stopper cylinders were placed in the apparatus, and secured tightly. Cylinders were rotated for 240 sec (4 minutes) and initial foam height was recorded. 2 drops (0.5 g) soil was added with disposable pipettes and then cylinders were rotated for 120 sec (2 minutes). Then the foam height was recorded. Then 2 drops (0.5 g) soil with disposable pipette were again added and the process continued for a total of 6 minutes (measured initial, 2 minutes, 4 minutes and 6 minutes foam height measurement).

TABLE 13

| Description | A | B | C | D | E | F |
|---|---|---|---|---|---|---|
| Light Ash | 30-60 | 30-60 | 30-60 | 30-60 | 30-60 | 30-60 |
| PEG400 | | | 10 | | | |
| Trilon M ® Granules | 5-15 | 5-15 | 5-15 | 5-15 | 5-15 | 5-15 |
| Acusol ® 445 ND | 1-10 | 1-10 | 1-10 | 1-10 | 1-10 | 1-10 |
| Amine oxide granules | | | 10 | 10 | 4 | |
| Solid betaine | | | | | 6 | 10 |
| Aerosol OT-75 | 5 | | | | | |
| Ecosurf EH-6 | 5 | | | | | |
| Tomadol 91-6 | | 10 | | | | |
| Organic Acid | 20 | 20 | 20 | 20 | 20 | 20 |
| Sodium Bicarbonate | 1-5 | 1-5 | 1-5 | 1-5 | 1-5 | 1-5 |
| Sodium Silicate | 1-5 | 1-5 | 1-5 | 1-5 | 1-5 | 1-5 |

Figure 9:
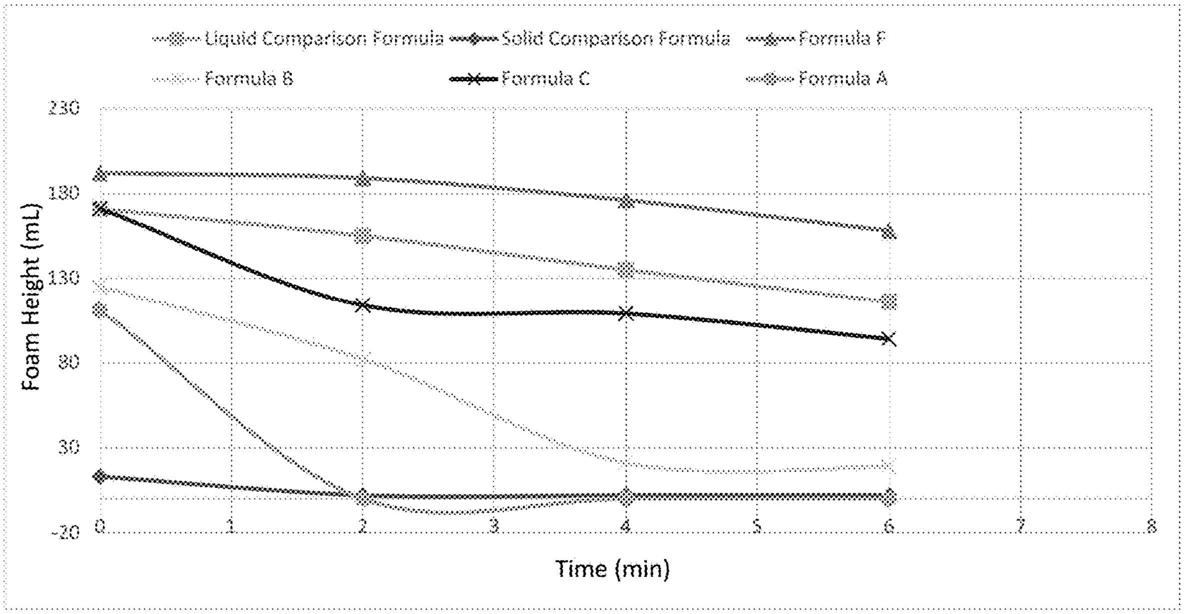
FIG. 9 shows a graph comparing the foam height of evaluated solid cleaning compositions over a period of time.

As shown in FIG. 9, all of the formulas tested resulted in foam levels greater than the solid comparison composition benchmark (commercially available multipurpose PPE-free tablet) with Formula F (containing the solid betaine as the cleaning surfactant) resulting in the highest and most stable foam height over time. The liquid comparison formula is a commercially available heavy-duty PPE-free degreaser formula.

Example 6

Performance is another important characteristic of a PPE-Free tablet degreaser or multiuse tablet composition. Traditionally, soils that degreasers target are tough enough to require high alkalinity or solvents. The evaluated formulations described herein use surfactants that aid in performance. Performance testing was focused on testing food soil (red soil). The red soils were prepared to include egg protein, two fat sources (lard and oil), and dye (iron (III) oxide (for color) for the first test (results described below and shown in FIG. 10). About 30 grams of lard was combined with about 30 grams of corn oil, about 15 grams of whole powdered egg, and about 1.5 grams of $Fe_2O_3$. The soil has 20% protein content. For the second test only the two fat sources and dye (eliminating the egg protein) were included in the modified red soil (results described below and shown in FIG. 11).

The evaluated formulas A, E, F are described in Table 13 of Example 5. The controls used were the same as Example 5 (Negative control (water), Liquid Comparison Formula (an inline PPE-free heavy duty degreaser), and Solid Comparison Formula (an inline PPE-free multipurpose tablet formula).

The back, grooved sides of a plurality of 3×3 inch white vinyl tiles were soiled with the red food soil using a 3" foam brush. The tiles were allowed to dry at room temperature overnight. The incubation period allows the bonds holding the triglycerides and proteins together in the soil to begin to crystallize and interlink. The next day, the tiles were placed into a soaking tray containing the test composition for about 1 minute. Testing was done using 5 gpg water at a higher concentration of 0.038 g/mL to clearly differentiate between formulas. For the Solid Comparison Formula and the three test formulas, a concentration of 0.038 g/mL was used as well. The Liquid Comparison Formula was tested at triple the typical use concentration for that product, 0.340 g/mL.

The soil removal testing was conducted using a Gardner Straightline Apparatus with a synthetic sponge.=The tiles were then placed into the Gardner Straightline Apparatus with the grain of the tiles parallel to the direction of sponge travel. The tiles were scrubbed with about 2 pounds of pressure with the moistened synthetic sponge for 16 cycles, rotating the tiles 90 degrees every 4 cycles for a complete 360 degree rotation of the tiles. The tiles were then rinsed with city water and dried overnight at room temperature. Mach 5 reflectance of the soiled tiles and washed tiles were measured to determine the average percent soil removal.

Figure 10:
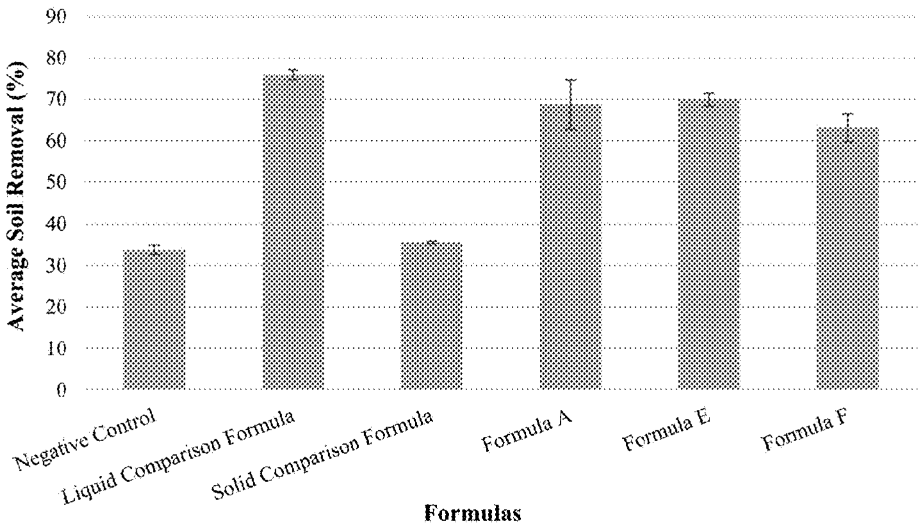
FIGS. 10-11 shows a graph evaluating average percent removal of protein and fat food soils (i.e. red soil) of the evaluated solid cleaning compositions compared to a PPE-free liquid and a PPE-free solid comparison formulation.
Figure 11:
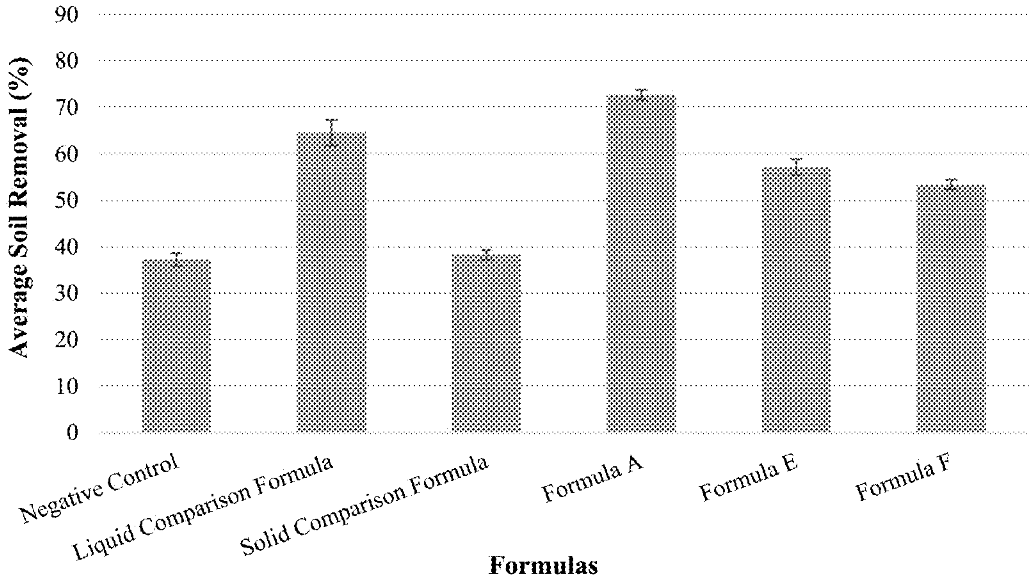

The results are shown in FIG. 10 where the average soil removal using traditional red soils improved with the use of formulas A, E, and F relative to the solid comparison formula. The results of average soil removal were substantially equivalent to the liquid comparison formula. Additional results are shown in FIG. 11 where the formulas A, E, and F again performed greater than the solid comparison formula, and closer to or above the liquid comparison formula.

Example 7

Additional dissolution testing was conducted to evaluate the alcohol alkoxylate structure on dissolution time. Formulations were made according to Table 8, but wherein the surfactant is one of Dehypon® LS 36 (a C12-14 alcohol alkoxylate, 3 EO, 6 PO), Dehypon® LS 54 (a C12-14 alcohol alkoxylate, 5 EO, 4 PO), Lutensol® XL 70 (a C10-Guerbet alcohol alkoxylate, 7 EO), Lutensol® XL 90 (a C10-Guerbet alcohol alkoxylate, 9 EO), or Ecosurf™ EH-9 (a 2-ethyl hexanol EO-PO, 9 EO, the number of PO groups not publicly available).

Figure 12:
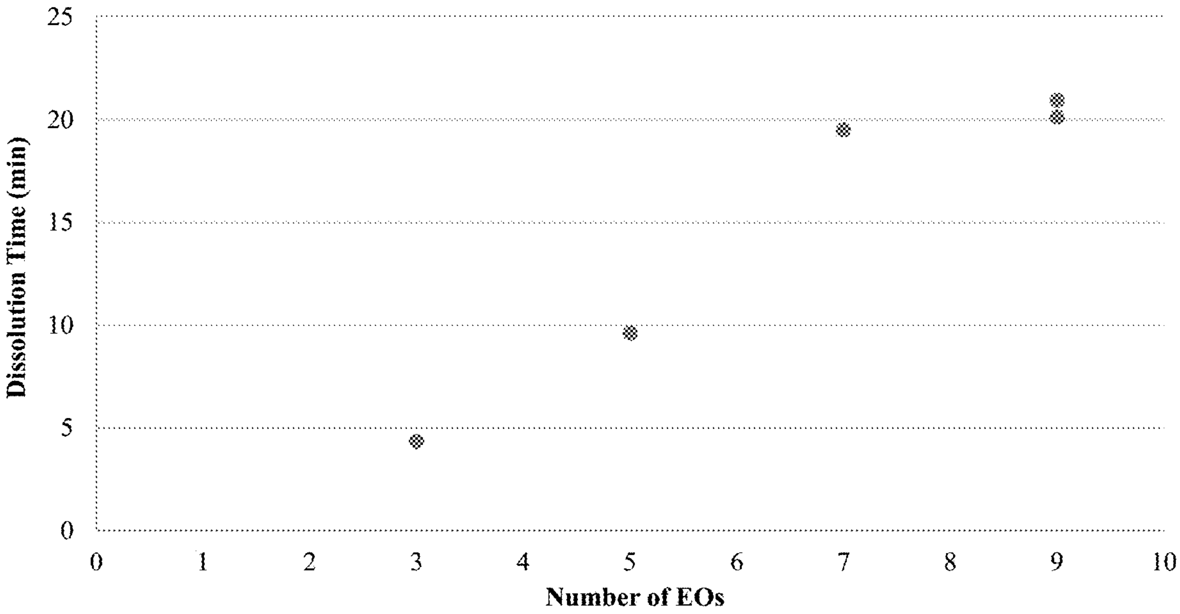
FIG. 12 shows a graph comparing the dissolution time of evaluated alcohol alkoxylate surfactants with varying number of EO groups showing a decrease in dissolution time with decreasing EO groups.

The results are shown in FIG. 12 wherein there is a trend of decreasing dissolution time that correlates with decreasing number of EO groups in the alcohol alkoxylate surfactant. In many commercial embodiments, a dissolution time of 15 minutes, or even 10 minutes or less is preferred.

Example 8

Exemplary solid cleaning compositions according to Table 14 were prepared as pressed tablets using about 500 psi for about 30 seconds. The tablets were sealed in glass containers under the following conditions: room temperature, 40° C. with 65% relative humidity, 50° C., and in a freezer. The stability of each tablet was evaluated by visual observation over the course of 8 weeks with photographs taken initially and after 1, 3, 4, and 8 weeks. Some of the tablets displayed color nonuniformity, considered a cosmetic attribute as the color of RTU solution is unaffected.

TABLE 14

| Description | G | H | I |
|---|---|---|---|
| Light Ash | 30-60 | 30-60 | 30-60 |
| Trilon M ® Granules | 5-15 | 5-15 | 5-15 |
| Acusol ® 445 ND | 1-10 | 1-10 | 1-10 |
| Aerosol OT-75 | 1-5 | 1-5 | 1-5 |
| Ecosurf EH-6 | 1-5 | 1-5 | 1-5 |
| Organic Acid | 20 | 20 | 20 |
| Sodium Bicarbonate | 1-5 | 1-5 | 1-5 |
| Sodium Silicate | 1-5 | 1-5 | 1-5 |
| Pylaklor Bright Amethyst LX-12379 | 0.05 | | |
| Pylaklor New Alkali Purple LX-10695 | | 0.05 | |
| Pylaklor Bright Violet LX-10966 | | | 0.05 |

Ready-to-use (RTU) solutions were made from tablets according to Table 14, formulations G and H to visually evaluate the stability of the formulations. The RTU solutions were made at a concentration of 0.013 g/mL (3 tablets per 710 mL) using 0 grain water, 5 grain water, and 17 grain water. Two of each of the RTU solutions were stored at room temperature and at 40° C. and monitored visually for two weeks, with photographs taken initially and after 1 and 2 weeks. Both formulas were stable for two weeks at both room temperature and at 40° C., with no significant loss of color. There was a slight precipitation observed in one sample that quickly went back into solution with one inversion.

Example 9

Tablet stability tests were conducted to evaluate the dimensional stability of tablets in different environments. Exemplary solid cleaning compositions according to Table 15 were prepared as pressed tablets by pressing 3 g of the powdered formula in a 20 mm tablet mold at about 500 psi for about 30 seconds. Each tablet was weighed, and diameter and height measurements were taken using a caliper. The average of three measurements was used for diameter and height to account for imperfections in the surface of the tablet. The tablets were placed in sealed glass jars and placed into one of four storage conditions for 8 weeks: room temperature, 40° C. with 65% relative humidity, 50° C. dry oven, or freezer. Diameter, height, and weight measurements were taken on each tablet at the beginning and then weekly thereafter. Percent change in tablet volume and weight was calculated based off the measurements.

TABLE 15

| Description | Stability Test Tablet |
|---|---|
| Light Ash | 30-60 |
| Trilon M ® Granules | 5-15 |
| Acusol ® 445 ND | 1-10 |
| Aerosol OT-75 | 1-10 |
| Ecosurf EH-6 | 1-10 |
| Organic Acid | 10-30 |
| Sodium Bicarbonate | 1-5 |
| Sodium Silicate | 1-5 |
| Total | 100 |

Figure 13:
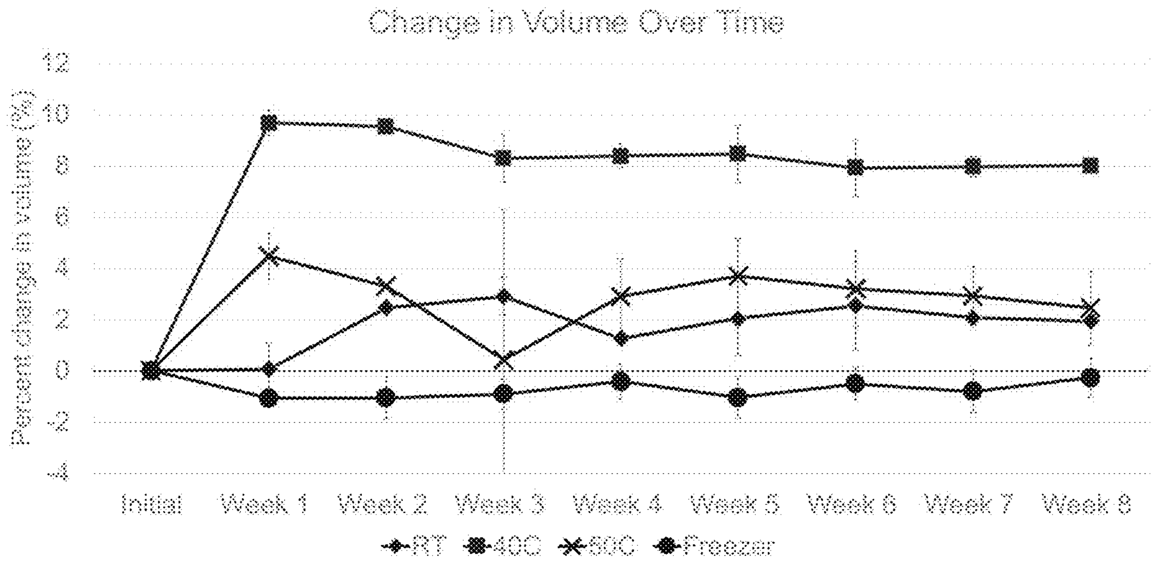
FIG. 13 shows a graph of percent change in volume of a pressed tablet over 8 weeks at various environmental conditions.

The calculated percent change in volume is compiled in Table 16 and shown graphically in FIG. 13.

TABLE 16

| | Room Temperature | 40° C., 65% relative humidity | 50° C. | Freezer |
|---|---|---|---|---|
| Initial | 0.000% | 0.000% | 0.000% | 0.000% |
| Week 1 | 0.060% | 9.669% | 4.467% | −1.075% |
| Week 2 | 2.450% | 9.515% | 3.307% | −1.065% |
| Week 3 | 2.902% | 8.285% | 0.434% | −0.913% |
| Week 4 | 1.259% | 8.374% | 2.907% | −0.425% |
| Week 5 | 2.044% | 8.466% | 3.704% | −1.041% |
| Week 6 | 2.533% | 7.908% | 3.196% | −0.509% |
| Week 7 | 2.069% | 7.962% | 2.923% | −0.816% |
| Week 8 | 1.929% | 8.001% | 2.438% | −0.274% |

All tablets were dimensionally stable with less than 10% change in volume over 8 weeks. The tablets were dimensionally stable even at high temperature (50° C.) for 8 weeks, which correlates to a shelf life of at least 2 years.

The present disclosure is further defined by the following numbered embodiments:

1. A solid cleaning composition comprising: (a) a non-hydroxide alkali metal alkalinity source; (b) an acid; (c) at least one water conditioning agent comprising an aminocarboxylic acid, a polycarboxylic acid, an aminophosphonate or combination thereof; and (d) a cleaning surfactant comprising an amphoteric, anionic and/or nonionic surfactant and/or a coating surfactant comprising a short chain nonionic, and/or polymer surfactant; wherein the composition is substantially-free of hydroxide alkalinity and is PPE-free.

2. The composition of embodiment 1, wherein the non-hydroxide alkali metal alkalinity source is at least one of alkali metal carbonate, alkali metal bicarbonate and/or alkali metal silicate.

3. The composition of any one of embodiments 1-2, comprising from about 20-90 wt-% of the non-hydroxide alkali metal alkalinity source, from about 10-40 wt-% of the acid, from about 0.1-25 wt-% of the water conditioning agent(s), from about 0-25 wt-% of the cleaning surfactant, and from about 0-15 wt-% of the coating surfactant, wherein at least one of the cleaning or coating surfactants is included in the composition.

4. The composition of any one of embodiments 1-3, wherein the acid is a polycarboxylic acid having between 2 and 4 carboxyl groups.

5. The composition of any one of embodiments 1-4, wherein the water conditioning agent is an aminocarboxylic acid and/or polycarboxylic acid.

6. The composition of embodiment 5, wherein the aminocarboxylic acid is one or more of methylglycinediacetic acid (MGDA), N-hydroxyethyliminodiacetic acid, nitrilotriacetic acid (NTA), ethylenediaminetetraacetic acid (EDTA), N-hydroxyethyl-ethylenediaminetriacetic acid (HEDTA), diethylenetriaminepentaacetic acid (DTPA), ethylenediaminetetraproprionic acid, and triethylenetetraaminehexaacetic acid, and wherein the polycarboxylic acid water conditioning agent is a homopolymer of acrylic acid.

7. The composition of any one of embodiments 1-6, wherein the cleaning surfactant comprises an amphoteric, anionic and/or nonionic surfactant in the amount between about 1-40 wt-%.

8. The composition of any one of embodiments 1-6, wherein the coating surfactant comprises a short chain PEG 200-800, an alcohol ethoxylate, a polymer surfactant or combination thereof.

9. The composition of embodiment 8, wherein the coating surfactant has a chain length of C11 or lower.

10. The composition of embodiment 8, wherein the coating surfactant is PEG200-400.

11. The composition of any one of embodiments 1-10, further comprising from about 0.01-5 wt-% of a corrosion inhibitor, wherein the corrosion inhibitor is an alkali metal silicate and/or alkali metal metasilicate.

12. The composition of any one of embodiments 1-11, wherein the solid is a pressed solid, cast block, extruded, molded or formed solid pellet, block, tablet, powder, granule or flake.

13. The composition of embodiment 12, wherein the solid composition has dimensional stability measured by a growth exponent of less than about 15% for at least 8 weeks at 50° C.

14. The composition of any one of embodiments 1-13, wherein the liquid use composition has a pH of less than about 10.5.

15. A solid cleaning composition comprising: (a) an alkali metal carbonate, alkali metal bicarbonate, and/or alkali metal silicate alkalinity source; (b) a polycarboxylic acid having between 2 and 4 carboxyl groups; (c) at least two water conditioning agents comprising an aminocarboxylic acid and polycarboxylic acid; (d) a cleaning surfactant comprising an amine oxide amphoteric surfactant and/or a coating surfactant comprising a short chain PEG 200-800, an alcohol ethoxylate, a polymer surfactant, or combinations thereof; and (e) a corrosion inhibitor comprising an alkali metal silicate and/or alkali metal metasilicate; wherein the composition is substantially-free of hydroxide alkalinity and is PPE-free.

16. The composition of embodiment 15, comprising from about 20-90 wt-% of the alkali metal carbonate, alkali metal bicarbonate, and/or alkali metal silicate alkalinity source, from about 10-40 wt-% of the acid, from about 1-20 wt-% of the water conditioning agent(s), from about 0-25 wt-% of the cleaning surfactant, from about 0-15 wt-% of the coating surfactant, wherein at least one of the cleaning or coating surfactants is included in the composition, and from about 0.01-10 wt-% of the corrosion inhibitor.

17. A concentrate or use solution of the composition of any one of embodiments 1-16 formed by adding the solid composition of any one of claims 1-16 to a diluent.

18. A method of preparing a cleaning composition comprising: adding the solid cleaning composition of any one of embodiments 1-16 to a diluent to dissolve the solid cleaning composition into a concentrate or use solution; wherein the dissolution time for the solid cleaning composition is less than about 20 minutes, or preferably less than about 10 minutes.

19. The method of embodiment 17, wherein the diluent is water.

20. A method of cleaning a hard surface comprising: providing the concentrate or use solution of embodiment 17 to a hard surface in need of cleaning.

21. The method of embodiment 20, where the hard surface is a food preparation surface, surface in a restaurant, a surface in a grocery store, a household surface, a floor, and/or a drive-thru surface, and/or wherein the hard surface contains food soils, preferably baked on food soils.

22. The method of any one of embodiments 20-21, wherein the hard surface is metal.

23. A solid cleaning composition consisting of, or consisting essentially of: (a) a non-hydroxide alkali metal alkalinity source; (b) an acid; (c) at least one water conditioning agent comprising an aminocarboxylic acid, a polycarboxylic acid, an aminophosphonate or combination thereof; and (d) a cleaning surfactant comprising an amphoteric, anionic and/or nonionic surfactant and/or a coating surfactant comprising a short chain nonionic, and/or polymer surfactant; and optionally further consisting of, or consisting essentially of (e) an alkali metal silicate and/or alkali metal metasilicate corrosion inhibitor, a dye, a preservative, and/or a biocide; wherein the composition is substantially-free of hydroxide alkalinity and is PPE-free.

24. A solid cleaning composition consisting essentially of, or consisting of: (a) an alkali metal carbonate, alkali metal bicarbonate, and/or alkali metal silicate alkalinity source; (b) a polycarboxylic acid having between 2 and 4 carboxyl groups; (c) at least two water conditioning agents comprising an aminocarboxylic acid and polycarboxylic acid; (d) a cleaning surfactant comprising an amine oxide amphoteric surfactant and/or a coating surfactant comprising a short chain PEG 200-800, an alcohol ethoxylate, a polymer surfactant, or combinations thereof; and (e) a corrosion inhibitor comprising an alkali metal silicate and/or alkali metal metasilicate; and optionally further consisting of, or consisting essentially of (f) a dye, a preservative, and/or a biocide; wherein the composition is substantially-free of hydroxide alkalinity and is PPE-free.

It is to be understood that while the invention has been described in conjunction with the detailed description thereof, the foregoing description is intended to illustrate, and not limit the scope of the invention, which is defined by the scope of the appended claims. Other embodiments, advantages, and modifications are within the scope of the following claims. Any reference to accompanying drawings which form a part hereof, are shown, by way of illustration only. It is understood that other embodiments may be utilized and structural changes may be made without departing from the scope of the present disclosure. All publications discussed and/or referenced herein are incorporated herein in their entirety.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:

1. A solid cleaning composition comprising:

(a) a non-hydroxide alkali metal alkalinity source;

(b) an acid comprising a polycarboxylic acid having between 2 and 4 carboxyl groups;

(c) at least one water conditioning agent comprising an aminocarboxylic acid, a polycarboxylic acid, an aminophosphonate or combination thereof;

(d) a coating surfactant comprising a PEG 200-400; and (e) optionally a cleaning surfactant comprising an amphoteric, anionic and/or nonionic surfactant wherein the composition is substantially-free of hydroxide alkalinity and is personal protective equipment-free.

2. The composition of claim 1, wherein the non-hydroxide alkali metal alkalinity source is at least one of alkali metal carbonate, alkali metal bicarbonate and/or alkali metal silicate.

3. The composition of claim 1, comprising from about 20 to about 90 wt-% of the non-hydroxide alkali metal alkalinity source, from about 10 to about 40 wt-% of the acid, from about 0.1 to about 25 wt-% of the water conditioning agent(s), from 0 to about 25 wt-% of the cleaning surfactant, and from about 1 to about 15 wt-% of the coating surfactant, wherein at least one of the cleaning or coating surfactants is included in the composition.

4. The composition of claim 1, wherein the acid is citric acid.

5. The composition of claim 1, wherein the water conditioning agent is an aminocarboxylic acid and/or polycarboxylic acid.

6. The composition of claim 5, wherein the water conditioning agent is one or more of methylglycinediacetic acid (MGDA), N-hydroxyethyliminodiacetic acid, nitrilotriacetic acid (NTA), ethylenediaminetetraacetic acid (EDTA), N-hydroxyethyl-ethylenediaminetriacetic acid (HEDTA), diethylenetriaminepentaacetic acid (DTPA), ethylenediaminetetraproprionic acid, and triethylenetetraaminehexaacetic acid, and a homopolymer of acrylic acid.

7. The composition of claim 1, wherein the cleaning surfactant comprises an amphoteric, anionic and/or nonionic surfactant in the amount between about 1-40 wt-%.

8. The composition of claim 1, wherein the coating surfactant further comprises an alcohol alkoxylate, a polymer surfactant or combination thereof.

9. The composition of claim 8, wherein the coating surfactant has a chain length of C11 or lower.

10. The composition of claim 8, wherein the coating surfactant is PEG 200-400.

11. The composition of claim 1, further comprising from about 0.1-5 wt-% of a corrosion inhibitor, wherein the corrosion inhibitor is an alkali metal silicate and/or alkali metal metasilicate.

12. The composition of claim 1, wherein the solid is a pressed solid, cast block, extruded, molded or formed solid pellet, block, tablet, powder, granule or flake.

13. The composition of claim 12, wherein the solid composition has dimensional stability measured by a growth exponent of less than about 15% for at least 8 weeks at 50° C.

14. The composition of claim 1, wherein a liquid use composition of the solid composition dissolved in water has a pH of less than about 10.5.

15. A solid cleaning composition comprising:

(a) an alkali metal carbonate, alkali metal bicarbonate, and/or alkali metal silicate alkalinity source;

(b) a polycarboxylic acid having between 2 and 4 carboxyl groups;

(c) at least two water conditioning agents comprising an aminocarboxylic acid and polycarboxylic acid;

(d) a coating surfactant comprising a short chain PEG 200-800; and (e) a corrosion inhibitor comprising an alkali metal silicate and/or alkali metal metasilicate; and (f) optionally a cleaning surfactant comprising an amine oxide amphoteric surfactant wherein the composition is substantially-free of hydroxide alkalinity and is personal protective equipment-free.

16. The composition of claim 15, comprising from about 20 to about 90 wt-% of the alkali metal carbonate, alkali metal bicarbonate, and/or alkali metal silicate alkalinity source, from about 10 to about 40 wt-% of the polycarboxylic acid having between 2 and 4 carboxyl groups, from about 1 to about 20 wt-% of the water conditioning agent(s), from 0 to about 25 wt-% of the cleaning surfactant, from about 1 to about 15 wt-% of the coating surfactant, and from about 0.01 to about 10 wt-% of the corrosion inhibitor.

17. A concentrate or use solution formed by adding the solid composition of claim 1 to a diluent.

18. A method of preparing a cleaning composition comprising:

adding the solid cleaning composition of claim 1 to a diluent to dissolve the solid cleaning composition into a concentrate or use solution;

wherein the dissolution time for the solid cleaning composition is less than about 20 minutes.

19. The method of claim 18, wherein the diluent is water.

20. A method of cleaning a hard surface comprising:

dissolving the solid cleaning composition in water to form a concentrate or use solution of claim 17; and contacting a hard surface in need of cleaning with the concentrate or use solution.

* * * * *